US008662760B2

(12) United States Patent
Cline et al.

(10) Patent No.: US 8,662,760 B2
(45) Date of Patent: Mar. 4, 2014

(54) FIBER OPTIC CONNECTOR EMPLOYING OPTICAL FIBER GUIDE MEMBER

(75) Inventors: Timothy S. Cline, Granite Falls, NC (US); Terry L. Cooke, Hickory, NC (US); David L. Dean, Jr., Hickory, NC (US); Tory A. Klavuhn, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 220 days.

(21) Appl. No.: 12/915,682

(22) Filed: Oct. 29, 2010

(65) Prior Publication Data

US 2012/0106897 A1    May 3, 2012

(51) Int. Cl.
*G02B 6/36* (2006.01)
(52) U.S. Cl.
USPC ............................................. 385/76; 385/86
(58) Field of Classification Search
None
See application file for complete search history.

(56) References Cited

U.S. PATENT DOCUMENTS

| | | | |
|---|---|---|---|
| 620,013 A | 2/1899 | Barnes | |
| 2,614,685 A | 10/1952 | Miller | |
| 3,175,873 A | 3/1965 | Blomquist et al. | |
| 3,212,192 A | 10/1965 | Bachmann et al. | |
| 3,433,886 A | 3/1969 | Myers | |
| 3,568,263 A | 3/1971 | Meehan | |
| 3,646,244 A | 2/1972 | Cole | |
| 3,880,396 A | 4/1975 | Freiberger et al. | |
| 3,906,592 A | 9/1975 | Sakasegawa et al. | |
| 4,047,797 A * | 9/1977 | Arnold et al. ................... | 385/78 |
| 4,059,872 A | 11/1977 | Delesandri | |
| 4,119,285 A | 10/1978 | Bisping et al. | |
| 4,239,316 A | 12/1980 | Spaulding | |
| 4,285,486 A | 8/1981 | Von Osten et al. | |
| 4,354,731 A | 10/1982 | Mouissie | |
| 4,457,482 A | 7/1984 | Kitagawa | |
| 4,525,012 A | 6/1985 | Dunner | |
| 4,597,173 A | 7/1986 | Chino et al. | |
| 4,611,875 A | 9/1986 | Clarke et al. | |
| 4,645,292 A | 2/1987 | Sammueller | |

(Continued)

FOREIGN PATENT DOCUMENTS

| CA | 2029592 A1 | 5/1992 |
|---|---|---|
| CA | 2186314 A1 | 4/1997 |

(Continued)

OTHER PUBLICATIONS

Non-Final Office Action for U.S. Appl. No. 11/820,300 mailed Apr. 25, 2012, 10 pages.*

(Continued)

*Primary Examiner* — Mike Stahl

(57) ABSTRACT

A fiber optic connector that employs an optical fiber guide member, and a cable assembly that uses the connector are disclosed. The connector has a connector housing formed by mateable sections. The connector housing defines a housing passage having opposite connector-end and channel-end portions that define respective connector-end and channel-end passages, with the channel-end portion configured to be arranged adjacent the end of a fiber optic cable. An optical fiber guide member is disposed in the channel-end passage and has a first transition end that faces the connector-end passage. The optical fiber guide member has a conduit configured to loosely confine and guide the optical fibers to the connector-end passage. Connector sub-assemblies can be operably supported at the connector-end portion supporting end portions of the optical fiber.

22 Claims, 6 Drawing Sheets

(56) References Cited

U.S. PATENT DOCUMENTS

| | | | |
|---|---|---|---|
| 4,657,340 A * | 4/1987 | Tanaka et al. | 385/78 |
| 4,702,551 A | 10/1987 | Coulombe | |
| 4,736,100 A | 4/1988 | Vastagh | |
| 4,744,629 A * | 5/1988 | Bertoglio et al. | 385/59 |
| 4,747,020 A | 5/1988 | Brickley et al. | |
| 4,752,110 A | 6/1988 | Blanchet et al. | |
| 4,787,706 A * | 11/1988 | Cannon et al. | 385/59 |
| 4,792,203 A | 12/1988 | Nelson et al. | |
| 4,798,432 A | 1/1989 | Becker et al. | |
| 4,808,774 A | 2/1989 | Crane | |
| 4,824,193 A | 4/1989 | Maeda et al. | |
| 4,824,196 A | 4/1989 | Bylander | |
| 4,826,277 A | 5/1989 | Weber et al. | |
| 4,838,643 A | 6/1989 | Hodges et al. | |
| 4,865,280 A | 9/1989 | Wollar | |
| 4,898,448 A | 2/1990 | Cooper | |
| 4,900,123 A | 2/1990 | Barlow | |
| 4,911,662 A | 3/1990 | Debortoli et al. | |
| 4,948,220 A | 8/1990 | Violo et al. | |
| 4,949,376 A | 8/1990 | Nieves et al. | |
| 4,971,421 A | 11/1990 | Ori | |
| 4,991,928 A | 2/1991 | Zimmer | |
| 4,995,688 A | 2/1991 | Anton et al. | |
| 5,001,602 A | 3/1991 | Suffi et al. | |
| 5,005,941 A | 4/1991 | Barlow et al. | |
| 5,017,211 A | 5/1991 | Wenger et al. | |
| 5,023,646 A | 6/1991 | Ishida et al. | |
| 5,024,498 A | 6/1991 | Becker et al. | |
| 5,028,114 A | 7/1991 | Krausse et al. | |
| 5,037,175 A | 8/1991 | Weber | |
| 5,048,918 A | 9/1991 | Daems et al. | |
| 5,066,149 A | 11/1991 | Wheeler et al. | |
| 5,067,784 A | 11/1991 | Debortoli et al. | |
| 5,071,211 A | 12/1991 | Debortoli et al. | |
| 5,071,220 A | 12/1991 | Ruello et al. | |
| 5,073,042 A | 12/1991 | Mulholland et al. | |
| 5,074,635 A | 12/1991 | Justice et al. | |
| 5,076,688 A | 12/1991 | Bowen et al. | |
| 5,080,459 A | 1/1992 | Wettengel et al. | |
| 5,100,221 A | 3/1992 | Carney et al. | |
| 5,104,336 A | 4/1992 | Hatanaka et al. | |
| 5,125,060 A | 6/1992 | Edmundson | |
| 5,127,082 A | 6/1992 | Below et al. | |
| 5,127,851 A | 7/1992 | Hilbert et al. | |
| 5,129,030 A | 7/1992 | Petrunia | |
| 5,133,039 A | 7/1992 | Dixit | |
| 5,138,678 A | 8/1992 | Briggs et al. | |
| 5,138,688 A | 8/1992 | Debortoli | |
| 5,142,598 A | 8/1992 | Tabone | |
| 5,142,607 A | 8/1992 | Petrotta et al. | |
| 5,150,277 A | 9/1992 | Bainbridge et al. | |
| D330,368 S | 10/1992 | Bourgeois et al. | |
| 5,152,760 A | 10/1992 | Latina | |
| 5,153,910 A | 10/1992 | Mickelson et al. | |
| 5,157,749 A | 10/1992 | Briggs et al. | |
| 5,167,001 A | 11/1992 | Debortoli et al. | |
| 5,170,452 A | 12/1992 | Ott | |
| 5,189,723 A | 2/1993 | Johnson et al. | |
| 5,204,929 A | 4/1993 | Machall et al. | |
| 5,209,572 A | 5/1993 | Jordan | |
| 5,214,735 A | 5/1993 | Henneberger et al. | |
| 5,224,186 A | 6/1993 | Kishimoto et al. | |
| 5,231,687 A | 7/1993 | Handley | |
| 5,231,688 A | 7/1993 | Zimmer | |
| 5,233,674 A | 8/1993 | Vladic | |
| 5,239,609 A | 8/1993 | Auteri | |
| 5,243,679 A | 9/1993 | Sharrow et al. | |
| 5,253,320 A | 10/1993 | Takahashi et al. | |
| 5,260,957 A | 11/1993 | Hakimi et al. | |
| 5,261,633 A | 11/1993 | Mastro | |
| 5,265,187 A | 11/1993 | Morin et al. | |
| 5,274,731 A | 12/1993 | White | |
| 5,280,138 A | 1/1994 | Preston et al. | |
| 5,285,515 A | 2/1994 | Milanowski et al. | |
| 5,315,679 A * | 5/1994 | Baldwin et al. | 385/76 |
| 5,317,663 A | 5/1994 | Beard et al. | |
| 5,323,478 A | 6/1994 | Milanowski et al. | |
| 5,323,480 A | 6/1994 | Mullaney et al. | |
| 5,333,193 A | 7/1994 | Cote et al. | |
| 5,333,221 A | 7/1994 | Briggs et al. | |
| 5,333,222 A | 7/1994 | Belenkiy et al. | |
| 5,337,400 A | 8/1994 | Morin et al. | |
| 5,339,379 A | 8/1994 | Kutsch et al. | |
| 5,347,603 A | 9/1994 | Belenkiy et al. | |
| 5,353,367 A | 10/1994 | Czosnowski et al. | |
| 5,359,688 A | 10/1994 | Underwood | |
| 5,363,466 A | 11/1994 | Milanowski et al. | |
| 5,363,467 A | 11/1994 | Keith | |
| 5,366,388 A | 11/1994 | Freeman et al. | |
| 5,367,598 A | 11/1994 | Devenish, III et al. | |
| 5,373,421 A | 12/1994 | Detsikas et al. | |
| 5,383,051 A | 1/1995 | Delrosso et al. | |
| 5,390,272 A | 2/1995 | Repta et al. | |
| 5,398,295 A | 3/1995 | Chang et al. | |
| 5,398,820 A | 3/1995 | Kiss | |
| 5,399,814 A | 3/1995 | Staber et al. | |
| 5,401,193 A | 3/1995 | Lo Cicero et al. | |
| 5,402,515 A | 3/1995 | Vidacovich et al. | |
| 5,408,557 A | 4/1995 | Hsu | |
| RE34,955 E | 5/1995 | Anton et al. | |
| 5,412,751 A | 5/1995 | Siemon et al. | |
| 5,416,837 A | 5/1995 | Cote et al. | |
| 5,418,874 A * | 5/1995 | Carlisle et al. | 385/76 |
| 5,420,956 A | 5/1995 | Grugel et al. | |
| 5,420,958 A | 5/1995 | Henson et al. | |
| 5,438,641 A | 8/1995 | Malacarne | |
| 5,442,725 A | 8/1995 | Peng | |
| 5,442,726 A | 8/1995 | Howard et al. | |
| 5,443,232 A | 8/1995 | Kesinger et al. | |
| 5,444,804 A | 8/1995 | Yui et al. | |
| 5,448,015 A | 9/1995 | Jamet et al. | |
| 5,450,518 A | 9/1995 | Burek et al. | |
| 5,458,019 A | 10/1995 | Trevino | |
| 5,471,555 A | 11/1995 | Braga et al. | |
| 5,479,505 A | 12/1995 | Butler et al. | |
| 5,481,634 A | 1/1996 | Anderson et al. | |
| 5,481,939 A | 1/1996 | Bernardini | |
| 5,490,229 A | 2/1996 | Ghandeharizadeh et al. | |
| 5,497,416 A | 3/1996 | Butler, III et al. | |
| 5,497,444 A | 3/1996 | Wheeler | |
| 5,511,144 A | 4/1996 | Hawkins et al. | |
| 5,511,798 A | 4/1996 | Kawamoto et al. | |
| 5,519,804 A | 5/1996 | Burek et al. | |
| 5,542,015 A | 7/1996 | Hultermans | |
| 5,546,495 A | 8/1996 | Bruckner et al. | |
| 5,548,641 A | 8/1996 | Butler et al. | |
| 5,553,183 A | 9/1996 | Bechamps | |
| 5,553,186 A | 9/1996 | Allen | |
| 5,572,617 A | 11/1996 | Bernhardt et al. | |
| 5,575,680 A | 11/1996 | Suffi | |
| 5,577,151 A | 11/1996 | Hoffer | |
| 5,590,234 A | 12/1996 | Pulido | |
| 5,595,507 A | 1/1997 | Braun et al. | |
| 5,596,670 A | 1/1997 | Debortoli et al. | |
| 5,600,020 A | 2/1997 | Wehle et al. | |
| 5,602,954 A | 2/1997 | Nolf et al. | |
| 5,608,606 A | 3/1997 | Blaney | |
| 5,613,030 A | 3/1997 | Hoffer et al. | |
| 5,617,501 A | 4/1997 | Miller et al. | |
| 5,638,474 A | 6/1997 | Lampert et al. | |
| 5,640,476 A | 6/1997 | Womack et al. | |
| 5,640,482 A | 6/1997 | Barry et al. | |
| 5,647,043 A | 7/1997 | Anderson et al. | |
| 5,647,045 A | 7/1997 | Robinson et al. | |
| 5,650,334 A | 7/1997 | Zuk et al. | |
| 5,668,911 A | 9/1997 | Debortoli | |
| 5,671,273 A | 9/1997 | Lanquist | |
| 5,689,605 A | 11/1997 | Cobb et al. | |
| 5,689,607 A | 11/1997 | Vincent et al. | |
| 5,694,511 A | 12/1997 | Pimpinella et al. | |
| 5,701,380 A | 12/1997 | Larson et al. | |
| 5,708,742 A | 1/1998 | Beun et al. | |
| 5,708,751 A | 1/1998 | Mattei | |
| 5,710,851 A | 1/1998 | Walter et al. | |

(56) References Cited

U.S. PATENT DOCUMENTS

| | | |
|---|---|---|
| 5,717,810 A | 2/1998 | Wheeler |
| 5,734,776 A | 3/1998 | Puetz |
| 5,740,300 A | 4/1998 | Hodge |
| 5,742,982 A | 4/1998 | Dodd et al. |
| 5,751,874 A | 5/1998 | Chudoba et al. |
| 5,751,882 A | 5/1998 | Daems et al. |
| 5,758,003 A | 5/1998 | Wheeler et al. |
| 5,758,004 A | 5/1998 | Alarcon et al. |
| 5,761,026 A | 6/1998 | Robinson et al. |
| 5,769,908 A | 6/1998 | Koppelman |
| 5,774,612 A | 6/1998 | Belenkiy et al. |
| 5,778,122 A | 7/1998 | Giebel et al. |
| 5,778,130 A | 7/1998 | Walters et al. |
| 5,781,686 A | 7/1998 | Robinson et al. |
| 5,790,741 A | 8/1998 | Vincent et al. |
| 5,793,920 A | 8/1998 | Wilkins et al. |
| 5,793,921 A | 8/1998 | Wilkins et al. |
| 5,796,908 A | 8/1998 | Vicory |
| 5,823,646 A | 10/1998 | Arizpe et al. |
| 5,825,955 A | 10/1998 | Ernst et al. |
| 5,825,961 A | 10/1998 | Wilkins et al. |
| 5,828,807 A | 10/1998 | Tucker et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,870,519 A | 2/1999 | Jenkins et al. |
| 5,874,733 A | 2/1999 | Silver et al. |
| 5,877,565 A | 3/1999 | Hollenbach et al. |
| 5,880,864 A | 3/1999 | Williams et al. |
| 5,881,200 A | 3/1999 | Burt |
| 5,883,995 A | 3/1999 | Lu et al. |
| 5,884,003 A | 3/1999 | Cloud et al. |
| 5,887,095 A | 3/1999 | Nagase et al. |
| 5,887,106 A | 3/1999 | Cheeseman et al. |
| 5,892,877 A | 4/1999 | Meyerhoefer |
| 5,894,540 A | 4/1999 | Drewing |
| 5,901,220 A | 5/1999 | Garver et al. |
| 5,903,693 A | 5/1999 | Brown |
| 5,909,298 A | 6/1999 | Shimada et al. |
| 5,913,006 A | 6/1999 | Summach |
| 5,914,976 A | 6/1999 | Jayaraman et al. |
| 5,915,055 A | 6/1999 | Bennett et al. |
| 5,923,804 A | 7/1999 | Rosson |
| 5,930,425 A | 7/1999 | Abel et al. |
| 5,933,557 A | 8/1999 | Ott |
| 5,943,460 A | 8/1999 | Mead et al. |
| 5,945,633 A | 8/1999 | Ott et al. |
| 5,946,440 A | 8/1999 | Puetz |
| 5,949,946 A | 9/1999 | Debortoli et al. |
| 5,953,962 A | 9/1999 | Hewson |
| 5,956,439 A | 9/1999 | Pimpinella |
| 5,956,444 A | 9/1999 | Duda et al. |
| 5,956,449 A | 9/1999 | Otani et al. |
| 5,966,492 A | 10/1999 | Bechamps et al. |
| 5,969,294 A | 10/1999 | Eberle et al. |
| 5,975,769 A | 11/1999 | Larson et al. |
| 5,978,540 A | 11/1999 | Bechamps et al. |
| 5,980,303 A | 11/1999 | Lee et al. |
| 5,993,071 A | 11/1999 | Hultermans |
| 5,995,700 A | 11/1999 | Burek et al. |
| 5,999,393 A | 12/1999 | Brower |
| 6,001,831 A | 12/1999 | Papenfuhs et al. |
| 6,009,224 A | 12/1999 | Allen |
| 6,009,225 A | 12/1999 | Ray et al. |
| 6,011,831 A | 1/2000 | Nieves et al. |
| 6,027,252 A | 2/2000 | Erdman et al. |
| 6,044,193 A | 3/2000 | Szentesi et al. |
| 6,058,235 A | 5/2000 | Hiramatsu et al. |
| 6,061,492 A | 5/2000 | Strause et al. |
| 6,078,661 A | 6/2000 | Arnett et al. |
| 6,079,881 A | 6/2000 | Roth |
| 6,127,627 A | 10/2000 | Daoud |
| 6,130,983 A | 10/2000 | Cheng |
| 6,134,370 A | 10/2000 | Childers et al. |
| 6,149,313 A | 11/2000 | Giebel et al. |
| 6,149,315 A | 11/2000 | Stephenson |
| 6,151,432 A | 11/2000 | Nakajima et al. |
| 6,160,946 A | 12/2000 | Thompson et al. |
| 6,181,861 B1 | 1/2001 | Wenski et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,201,920 B1 | 3/2001 | Noble et al. |
| 6,208,796 B1 | 3/2001 | Williams |
| 6,212,324 B1 | 4/2001 | Lin et al. |
| 6,215,938 B1 | 4/2001 | Reitmeier et al. |
| 6,227,717 B1 | 5/2001 | Ott et al. |
| 6,234,683 B1 | 5/2001 | Waldron et al. |
| 6,234,685 B1 | 5/2001 | Carlisle et al. |
| 6,236,795 B1 | 5/2001 | Rodgers |
| 6,240,229 B1 | 5/2001 | Roth |
| 6,243,522 B1 | 6/2001 | Allan et al. |
| 6,245,998 B1 | 6/2001 | Curry et al. |
| 6,263,141 B1 | 7/2001 | Smith |
| 6,265,680 B1 | 7/2001 | Robertson |
| 6,269,212 B1 | 7/2001 | Schiattone |
| 6,275,641 B1 | 8/2001 | Daoud |
| 6,278,829 B1 | 8/2001 | BuAbbud et al. |
| 6,278,831 B1 | 8/2001 | Henderson et al. |
| D448,005 S | 9/2001 | Klein, Jr. et al. |
| 6,292,614 B1 | 9/2001 | Smith et al. |
| 6,301,424 B1 | 10/2001 | Hwang |
| 6,307,997 B1 | 10/2001 | Walters et al. |
| 6,318,824 B1 | 11/2001 | LaGrotta et al. |
| 6,321,017 B1 | 11/2001 | Janus et al. |
| 6,322,279 B1 | 11/2001 | Yamamoto et al. |
| 6,325,549 B1 | 12/2001 | Shevchuk |
| RE37,489 E | 1/2002 | Anton et al. |
| 6,343,313 B1 | 1/2002 | Salesky et al. |
| 6,347,888 B1 | 2/2002 | Puetz |
| 6,353,696 B1 | 3/2002 | Gordon et al. |
| 6,353,697 B1 | 3/2002 | Daoud |
| 6,359,228 B1 | 3/2002 | Strause et al. |
| 6,363,200 B1 | 3/2002 | Thompson et al. |
| 6,370,309 B1 | 4/2002 | Daoud |
| 6,377,218 B1 | 4/2002 | Nelson et al. |
| 6,379,052 B1 | 4/2002 | De Jong et al. |
| 6,385,374 B2 | 5/2002 | Kropp |
| 6,385,381 B1 | 5/2002 | Janus et al. |
| 6,389,214 B1 | 5/2002 | Smith et al. |
| 6,397,166 B1 | 5/2002 | Leung et al. |
| 6,398,149 B1 | 6/2002 | Hines et al. |
| 6,411,767 B1 | 6/2002 | Burrous et al. |
| 6,418,262 B1 | 7/2002 | Puetz et al. |
| 6,424,781 B1 | 7/2002 | Puetz et al. |
| 6,425,694 B1 | 7/2002 | Szilagyi et al. |
| 6,427,045 B1 | 7/2002 | Matthes et al. |
| 6,431,762 B1 | 8/2002 | Taira et al. |
| 6,434,313 B1 | 8/2002 | Clapp, Jr. et al. |
| 6,438,310 B1 | 8/2002 | Lance et al. |
| 6,452,925 B1 | 9/2002 | Sistanizadeh et al. |
| 6,456,773 B1 | 9/2002 | Keys |
| 6,464,402 B1 | 10/2002 | Andrews et al. |
| 6,466,724 B1 | 10/2002 | Glover et al. |
| 6,469,905 B1 | 10/2002 | Hwang |
| D466,087 S | 11/2002 | Cuny et al. |
| 6,478,472 B1 | 11/2002 | Anderson et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,958 B1 | 11/2002 | Xue et al. |
| 6,496,640 B1 | 12/2002 | Harvey et al. |
| 6,504,988 B1 | 1/2003 | Trebesch et al. |
| 6,507,980 B2 | 1/2003 | Bremicker |
| 6,510,274 B1 | 1/2003 | Wu et al. |
| 6,532,332 B2 | 3/2003 | Solheid et al. |
| 6,533,472 B1 | 3/2003 | Dinh et al. |
| 6,535,397 B2 | 3/2003 | Clark et al. |
| 6,539,147 B1 | 3/2003 | Mahony |
| 6,539,160 B2 | 3/2003 | Battey et al. |
| 6,542,688 B1 | 4/2003 | Battey et al. |
| 6,550,977 B2 | 4/2003 | Hizuka |
| 6,554,485 B1 | 4/2003 | Beatty et al. |

(56) References Cited

U.S. PATENT DOCUMENTS

| | | |
|---|---|---|
| 6,560,334 B1 | 5/2003 | Mullaney et al. |
| 6,567,601 B2 | 5/2003 | Daoud et al. |
| 6,571,048 B1 | 5/2003 | Bechamps et al. |
| 6,577,595 B1 | 6/2003 | Counterman |
| 6,577,801 B2 | 6/2003 | Broderick et al. |
| 6,579,014 B2 | 6/2003 | Melton et al. |
| 6,584,267 B1 | 6/2003 | Caveney et al. |
| 6,587,630 B2 | 7/2003 | Spence et al. |
| 6,588,938 B1 | 7/2003 | Lampert et al. |
| 6,591,051 B2 | 7/2003 | Solheid et al. |
| 6,592,266 B1 | 7/2003 | Hankins et al. |
| 6,597,670 B1 | 7/2003 | Tweedy et al. |
| 6,600,866 B2 | 7/2003 | Gatica et al. |
| 6,601,997 B2 | 8/2003 | Ngo |
| 6,612,515 B1 | 9/2003 | Tinucci et al. |
| 6,614,978 B1 | 9/2003 | Caveney |
| 6,614,980 B1 | 9/2003 | Mahony |
| 6,621,975 B2 | 9/2003 | Laporte et al. |
| 6,625,374 B2 | 9/2003 | Holman et al. |
| 6,625,375 B1 | 9/2003 | Mahony |
| 6,631,237 B2 | 10/2003 | Knudsen et al. |
| 6,640,042 B2 | 10/2003 | Araki et al. |
| RE38,311 E | 11/2003 | Wheeler |
| 6,644,863 B1 | 11/2003 | Azami et al. |
| 6,647,197 B1 | 11/2003 | Marrs et al. |
| 6,648,520 B2 | 11/2003 | McDonald et al. |
| 6,654,536 B2 | 11/2003 | Battey et al. |
| 6,668,127 B1 | 12/2003 | Mahony |
| 6,677,520 B1 | 1/2004 | Kim et al. |
| 6,679,604 B1 | 1/2004 | Bove et al. |
| 6,687,450 B1 | 2/2004 | Kempeneers et al. |
| 6,701,056 B2 | 3/2004 | Burek et al. |
| 6,710,366 B1 | 3/2004 | Lee et al. |
| 6,715,619 B2 | 4/2004 | Kim et al. |
| 6,719,149 B2 | 4/2004 | Tomino |
| 6,741,784 B1 | 5/2004 | Guan |
| 6,741,785 B2 | 5/2004 | Barthel et al. |
| 6,746,037 B1 | 6/2004 | Kaplenski et al. |
| 6,748,154 B2 | 6/2004 | O'Leary et al. |
| 6,748,155 B2 | 6/2004 | Kim et al. |
| 6,758,600 B2 | 7/2004 | Del Grosso et al. |
| 6,768,860 B2 | 7/2004 | Liberty |
| 6,771,861 B2 | 8/2004 | Wagner et al. |
| 6,773,297 B2 | 8/2004 | Komiya |
| 6,778,525 B1 | 8/2004 | Baum et al. |
| 6,778,752 B2 | 8/2004 | Laporte et al. |
| 6,786,647 B1 | 9/2004 | Hinds et al. |
| 6,788,871 B2 | 9/2004 | Taylor |
| 6,792,190 B2 | 9/2004 | Xin et al. |
| 6,798,751 B1 | 9/2004 | Voit et al. |
| 6,804,447 B2 | 10/2004 | Smith et al. |
| 6,810,194 B2 | 10/2004 | Griffiths et al. |
| 6,813,412 B2 | 11/2004 | Lin |
| 6,816,660 B2 | 11/2004 | Nashimoto |
| 6,819,856 B2 | 11/2004 | Dagley et al. |
| 6,819,857 B2 | 11/2004 | Douglas et al. |
| 6,826,174 B1 | 11/2004 | Erekson et al. |
| 6,826,346 B2 | 11/2004 | Sloan et al. |
| 6,839,428 B2 | 1/2005 | Brower et al. |
| 6,839,438 B1 | 1/2005 | Riegelsberger et al. |
| 6,840,815 B2 | 1/2005 | Musolf et al. |
| 6,845,207 B2 | 1/2005 | Schray |
| 6,848,862 B1 | 2/2005 | Schlig |
| 6,850,685 B2 | 2/2005 | Tinucci et al. |
| 6,853,637 B1 | 2/2005 | Norrell et al. |
| 6,854,894 B1 | 2/2005 | Yunker et al. |
| 6,856,334 B1 | 2/2005 | Fukui |
| 6,865,331 B2 | 3/2005 | Mertesdorf |
| 6,865,334 B2 | 3/2005 | Cooke et al. |
| 6,866,541 B2 | 3/2005 | Barker et al. |
| 6,868,216 B1 | 3/2005 | Gehrke |
| 6,869,227 B2 | 3/2005 | Del Grosso et al. |
| 6,870,734 B2 | 3/2005 | Mertesdorf et al. |
| 6,870,997 B2 | 3/2005 | Cooke |
| 6,879,545 B2 | 4/2005 | Cooke et al. |
| 6,915,058 B2 | 7/2005 | Pons |
| 6,920,273 B2 | 7/2005 | Knudsen |
| 6,920,274 B2 | 7/2005 | Rapp et al. |
| 6,925,241 B2 | 8/2005 | Bohle et al. |
| 6,934,451 B2 | 8/2005 | Cooke |
| 6,934,456 B2 | 8/2005 | Ferris et al. |
| 6,937,807 B2 | 8/2005 | Franklin et al. |
| 6,944,383 B1 | 9/2005 | Herzog et al. |
| 6,944,389 B2 | 9/2005 | Giraud et al. |
| 6,952,530 B2 | 10/2005 | Helvajian et al. |
| 6,963,690 B1 | 11/2005 | Kassal et al. |
| 6,968,107 B2 | 11/2005 | Belardi et al. |
| 6,968,111 B2 | 11/2005 | Trebesch et al. |
| 6,985,665 B2 | 1/2006 | Baechtle |
| 6,993,237 B2 | 1/2006 | Cooke et al. |
| 7,000,784 B2 | 2/2006 | Canty et al. |
| 7,005,582 B2 | 2/2006 | Muller et al. |
| 7,006,748 B2 | 2/2006 | Dagley et al. |
| 7,007,296 B2 | 2/2006 | Rakib |
| 7,027,695 B2 | 4/2006 | Cooke et al. |
| 7,027,706 B2 | 4/2006 | Diaz et al. |
| 7,031,588 B2 | 4/2006 | Cowley et al. |
| 7,035,510 B2 | 4/2006 | Zimmel et al. |
| 7,038,137 B2 | 5/2006 | Grubish et al. |
| 7,054,513 B2 | 5/2006 | Herz et al. |
| 7,066,748 B2 | 6/2006 | Bricaud et al. |
| 7,068,907 B2 | 6/2006 | Schray |
| 7,070,459 B2 | 7/2006 | Denovich et al. |
| 7,079,744 B2 | 7/2006 | Douglas et al. |
| 7,090,406 B2 | 8/2006 | Melton et al. |
| 7,090,407 B2 | 8/2006 | Melton et al. |
| 7,094,095 B1 | 8/2006 | Caveney |
| 7,097,047 B2 | 8/2006 | Lee et al. |
| 7,101,093 B2 | 9/2006 | Hsiao et al. |
| 7,102,884 B2 | 9/2006 | Mertesdorf et al. |
| 7,103,255 B2 | 9/2006 | Reagan et al. |
| 7,110,654 B2 | 9/2006 | Dillat |
| 7,111,990 B2 | 9/2006 | Melton et al. |
| 7,113,679 B2 | 9/2006 | Melton et al. |
| 7,113,686 B2 | 9/2006 | Bellekens et al. |
| 7,113,687 B2 | 9/2006 | Womack et al. |
| 7,116,491 B1 | 10/2006 | Willey et al. |
| 7,116,883 B2 | 10/2006 | Kline et al. |
| 7,118,281 B2 | 10/2006 | Chiu et al. |
| 7,118,405 B2 | 10/2006 | Peng |
| 7,120,347 B2 | 10/2006 | Blackwell, Jr. et al. |
| 7,120,348 B2 | 10/2006 | Trebesch et al. |
| 7,120,349 B2 | 10/2006 | Elliott |
| 7,128,471 B2 | 10/2006 | Wilson |
| 7,139,462 B1 | 11/2006 | Richtman |
| 7,171,099 B2 | 1/2007 | Barnes et al. |
| 7,171,121 B1 | 1/2007 | Skarica et al. |
| 7,181,142 B1 | 2/2007 | Xu et al. |
| 7,193,783 B2 | 3/2007 | Willey et al. |
| 7,194,181 B2 | 3/2007 | Holmberg et al. |
| 7,195,521 B2 | 3/2007 | Musolf et al. |
| 7,200,314 B2 | 4/2007 | Womack et al. |
| 7,200,316 B2 | 4/2007 | Giraud et al. |
| 7,220,065 B2 | 5/2007 | Han et al. |
| 7,228,036 B2 | 6/2007 | Elkins, II et al. |
| 7,231,125 B2 | 6/2007 | Douglas et al. |
| 7,234,878 B2 | 6/2007 | Yamauchi et al. |
| 7,236,677 B2 | 6/2007 | Escoto et al. |
| 7,239,789 B2 | 7/2007 | Grubish et al. |
| 7,245,809 B1 | 7/2007 | Gniadek et al. |
| 7,259,325 B2 | 8/2007 | Pincu et al. |
| 7,266,283 B2 | 9/2007 | Kline et al. |
| 7,270,485 B1 | 9/2007 | Robinson et al. |
| 7,272,291 B2 | 9/2007 | Bayazit et al. |
| 7,274,852 B1 | 9/2007 | Smrha et al. |
| 7,289,731 B2 | 10/2007 | Thinguldstad |
| 7,292,769 B2 | 11/2007 | Watanabe et al. |
| 7,298,950 B2 | 11/2007 | Frohlich |
| 7,300,216 B2 | 11/2007 | Morse et al. |
| 7,300,308 B2 | 11/2007 | Laursen et al. |
| 7,302,149 B2 | 11/2007 | Swam et al. |
| 7,302,153 B2 | 11/2007 | Thom |
| 7,302,154 B2 | 11/2007 | Trebesch et al. |
| 7,308,184 B2 | 12/2007 | Barnes et al. |

(56) References Cited

U.S. PATENT DOCUMENTS

| | | |
|---|---|---|
| 7,310,471 B2 | 12/2007 | Bayazit et al. |
| 7,310,472 B2 | 12/2007 | Haberman |
| 7,315,681 B2 | 1/2008 | Kewitsch |
| 7,325,975 B2 | 2/2008 | Yamada et al. |
| 7,330,625 B2 | 2/2008 | Barth |
| 7,330,626 B2 | 2/2008 | Kowalczyk et al. |
| 7,330,629 B2 | 2/2008 | Cooke et al. |
| 7,331,718 B2 | 2/2008 | Yazaki et al. |
| 7,340,145 B2 | 3/2008 | Allen |
| 7,349,615 B2 | 3/2008 | Frazier et al. |
| 7,373,071 B2 | 5/2008 | Douglas et al. |
| 7,376,321 B2 | 5/2008 | Bolster et al. |
| 7,376,323 B2 | 5/2008 | Zimmel |
| 7,391,952 B1 | 6/2008 | Ugolini et al. |
| 7,397,996 B2 | 7/2008 | Herzog et al. |
| 7,400,813 B2 | 7/2008 | Zimmel |
| 7,409,137 B2 | 8/2008 | Barnes |
| 7,414,198 B2 | 8/2008 | Stansbie et al. |
| 7,417,188 B2 | 8/2008 | McNutt et al. |
| 7,418,182 B2 | 8/2008 | Krampotich |
| 7,418,184 B1 | 8/2008 | Gonzales et al. |
| 7,421,182 B2 | 9/2008 | Bayazit et al. |
| 7,428,363 B2 | 9/2008 | Leon et al. |
| 7,437,049 B2 | 10/2008 | Krampotich |
| 7,439,453 B2 | 10/2008 | Murano et al. |
| 7,454,113 B2 | 11/2008 | Barnes |
| 7,460,757 B2 | 12/2008 | Hoehne et al. |
| 7,460,758 B2 | 12/2008 | Xin |
| 7,461,981 B2 | 12/2008 | Yow, Jr. et al. |
| 7,462,779 B2 | 12/2008 | Caveney et al. |
| 7,463,810 B2 | 12/2008 | Bayazit et al. |
| 7,463,811 B2 | 12/2008 | Trebesch et al. |
| 7,469,090 B2 | 12/2008 | Ferris et al. |
| 7,471,867 B2 | 12/2008 | Vogel et al. |
| 7,474,828 B2 | 1/2009 | Leon et al. |
| 7,477,824 B2 | 1/2009 | Reagan et al. |
| 7,477,826 B2 | 1/2009 | Mullaney et al. |
| 7,480,438 B2 | 1/2009 | Douglas et al. |
| 7,488,205 B2 | 2/2009 | Spisany et al. |
| 7,493,002 B2 | 2/2009 | Coburn et al. |
| 7,496,269 B1 | 2/2009 | Lee |
| 7,499,622 B2 | 3/2009 | Castonguay et al. |
| 7,499,623 B2 | 3/2009 | Barnes et al. |
| 7,507,111 B2 | 3/2009 | Togami et al. |
| 7,509,015 B2 | 3/2009 | Murano |
| 7,509,016 B2 | 3/2009 | Smith et al. |
| 7,522,804 B2 | 4/2009 | Araki et al. |
| 7,526,171 B2 | 4/2009 | Caveney et al. |
| 7,526,172 B2 | 4/2009 | Gniadek et al. |
| 7,526,174 B2 | 4/2009 | Leon et al. |
| 7,529,458 B2 | 5/2009 | Spisany et al. |
| 7,534,958 B2 | 5/2009 | McNutt et al. |
| 7,536,075 B2 | 5/2009 | Zimmel |
| 7,542,645 B1 | 6/2009 | Hua et al. |
| 7,555,193 B2 | 6/2009 | Rapp et al. |
| 7,558,458 B2 | 7/2009 | Gronvall et al. |
| 7,565,051 B2 | 7/2009 | Vongseng |
| 7,567,744 B2 | 7/2009 | Krampotich et al. |
| 7,570,860 B2 | 8/2009 | Smrha et al. |
| 7,570,861 B2 | 8/2009 | Smrha et al. |
| 7,577,331 B2 | 8/2009 | Laurisch et al. |
| 7,603,020 B1 | 10/2009 | Wakileh et al. |
| 7,607,938 B2 | 10/2009 | Clark et al. |
| 7,609,967 B2 | 10/2009 | Hochbaum et al. |
| 7,613,377 B2 | 11/2009 | Gonzales et al. |
| 7,620,272 B2 | 11/2009 | Hino et al. |
| 7,620,287 B2 | 11/2009 | Appenzeller et al. |
| 7,641,398 B2 | 1/2010 | O'Riorden et al. |
| 7,668,430 B2 | 2/2010 | McClellan et al. |
| 7,668,433 B2 | 2/2010 | Bayazit et al. |
| 7,672,561 B1 | 3/2010 | Keith et al. |
| 7,676,135 B2 | 3/2010 | Chen |
| 7,697,811 B2 | 4/2010 | Murano et al. |
| 7,715,125 B2 | 5/2010 | Willey |
| 7,715,683 B2 | 5/2010 | Kowalczyk et al. |
| 7,740,409 B2 | 6/2010 | Bolton et al. |
| 7,743,495 B2 | 6/2010 | Mori et al. |
| 7,756,382 B2 | 7/2010 | Saravanos et al. |
| 7,760,984 B2 | 7/2010 | Solheid et al. |
| 7,764,858 B2 | 7/2010 | Bayazit et al. |
| 7,764,859 B2 | 7/2010 | Krampotich et al. |
| 7,809,235 B2 | 10/2010 | Reagan et al. |
| 7,822,310 B2 | 10/2010 | Castonguay et al. |
| 7,850,372 B2 | 12/2010 | Nishimura et al. |
| 7,853,112 B2 | 12/2010 | Zimmel et al. |
| 7,856,166 B2 | 12/2010 | Biribuze et al. |
| 7,914,332 B2 | 3/2011 | Song et al. |
| 7,942,589 B2 | 5/2011 | Yazaki et al. |
| 7,945,135 B2 | 5/2011 | Cooke et al. |
| 7,945,136 B2 | 5/2011 | Cooke et al. |
| 7,970,250 B2 | 6/2011 | Morris |
| 8,014,171 B2 | 9/2011 | Kelly et al. |
| 8,014,646 B2 | 9/2011 | Keith et al. |
| 8,020,813 B1 | 9/2011 | Clark et al. |
| 8,059,932 B2 | 11/2011 | Hill et al. |
| 8,107,785 B2 | 1/2012 | Berglund et al. |
| 8,206,058 B2 | 6/2012 | Vrondran et al. |
| 8,537,477 B2 | 9/2013 | Shioda |
| 2001/0010741 A1 | 8/2001 | Hizuka |
| 2001/0029125 A1 | 10/2001 | Morita et al. |
| 2002/0010818 A1 | 1/2002 | Wei et al. |
| 2002/0012353 A1 | 1/2002 | Gerszberg et al. |
| 2002/0034290 A1 | 3/2002 | Pershan |
| 2002/0037139 A1* | 3/2002 | Asao et al. .................. 385/78 |
| 2002/0064364 A1 | 5/2002 | Battey et al. |
| 2002/0131730 A1 | 9/2002 | Keeble et al. |
| 2002/0136519 A1 | 9/2002 | Tinucci et al. |
| 2002/0141724 A1 | 10/2002 | Ogawa et al. |
| 2002/0150372 A1 | 10/2002 | Schray |
| 2002/0172467 A1 | 11/2002 | Anderson et al. |
| 2002/0181918 A1 | 12/2002 | Spence et al. |
| 2002/0181922 A1 | 12/2002 | Xin et al. |
| 2002/0194596 A1 | 12/2002 | Srivastava |
| 2003/0007743 A1 | 1/2003 | Asada |
| 2003/0007767 A1 | 1/2003 | Douglas et al. |
| 2003/0021539 A1 | 1/2003 | Kwon et al. |
| 2003/0066998 A1 | 4/2003 | Lee |
| 2003/0086675 A1 | 5/2003 | Wu et al. |
| 2003/0095753 A1 | 5/2003 | Wada et al. |
| 2003/0147604 A1 | 8/2003 | Tapia et al. |
| 2003/0174996 A1 | 9/2003 | Henschel et al. |
| 2003/0180012 A1 | 9/2003 | Deane et al. |
| 2003/0183413 A1 | 10/2003 | Kato |
| 2003/0199201 A1 | 10/2003 | Mullaney et al. |
| 2003/0210882 A1 | 11/2003 | Barthel et al. |
| 2003/0223723 A1 | 12/2003 | Massey et al. |
| 2003/0235387 A1 | 12/2003 | Dufour |
| 2004/0013389 A1 | 1/2004 | Taylor |
| 2004/0013390 A1 | 1/2004 | Kim et al. |
| 2004/0074852 A1 | 4/2004 | Knudsen et al. |
| 2004/0086238 A1 | 5/2004 | Finona et al. |
| 2004/0086252 A1 | 5/2004 | Smith et al. |
| 2004/0147159 A1 | 7/2004 | Urban et al. |
| 2004/0151465 A1 | 8/2004 | Krampotich et al. |
| 2004/0175090 A1 | 9/2004 | Vastmans et al. |
| 2004/0192115 A1 | 9/2004 | Bugg |
| 2004/0208459 A1 | 10/2004 | Mizue et al. |
| 2004/0228598 A1 | 11/2004 | Allen et al. |
| 2004/0240882 A1 | 12/2004 | Lipski et al. |
| 2004/0264873 A1 | 12/2004 | Smith et al. |
| 2005/0002633 A1 | 1/2005 | Solheid et al. |
| 2005/0008131 A1 | 1/2005 | Cook |
| 2005/0026497 A1 | 2/2005 | Holliday |
| 2005/0036749 A1 | 2/2005 | Vogel et al. |
| 2005/0074990 A1 | 4/2005 | Shearman et al. |
| 2005/0076149 A1 | 4/2005 | McKown et al. |
| 2005/0083959 A1 | 4/2005 | Binder |
| 2005/0107086 A1 | 5/2005 | Tell et al. |
| 2005/0111809 A1 | 5/2005 | Giraud et al. |
| 2005/0111810 A1 | 5/2005 | Giraud et al. |
| 2005/0123261 A1 | 6/2005 | Bellekens et al. |
| 2005/0129379 A1 | 6/2005 | Reagan et al. |
| 2005/0201073 A1 | 9/2005 | Pincu et al. |
| 2005/0232566 A1 | 10/2005 | Rapp et al. |

(56) References Cited

U.S. PATENT DOCUMENTS

| | | |
|---|---|---|
| 2005/0233647 A1 | 10/2005 | Denovich et al. |
| 2005/0254757 A1 | 11/2005 | Ferretti, III et al. |
| 2005/0281526 A1 | 12/2005 | Vongseng et al. |
| 2005/0281527 A1 | 12/2005 | Wilson et al. |
| 2006/0007562 A1 | 1/2006 | Willey et al. |
| 2006/0018448 A1 | 1/2006 | Stevens et al. |
| 2006/0018622 A1 | 1/2006 | Caveney |
| 2006/0039290 A1 | 2/2006 | Roden et al. |
| 2006/0044774 A1 | 3/2006 | Vasavda et al. |
| 2006/0072606 A1 | 4/2006 | Posthuma |
| 2006/0077968 A1 | 4/2006 | Pitsoulakis et al. |
| 2006/0093303 A1 | 5/2006 | Reagan et al. |
| 2006/0147172 A1 | 7/2006 | Luther et al. |
| 2006/0153517 A1 | 7/2006 | Reagan et al. |
| 2006/0160377 A1 | 7/2006 | Huang |
| 2006/0165365 A1 | 7/2006 | Feustel et al. |
| 2006/0165366 A1 | 7/2006 | Feustel et al. |
| 2006/0191700 A1 | 8/2006 | Herzog et al. |
| 2006/0193590 A1 | 8/2006 | Puetz et al. |
| 2006/0193591 A1 | 8/2006 | Rapp et al. |
| 2006/0198098 A1 | 9/2006 | Clark et al. |
| 2006/0215980 A1 | 9/2006 | Bayazit et al. |
| 2006/0269194 A1 | 11/2006 | Luther et al. |
| 2006/0269206 A1 | 11/2006 | Zimmel |
| 2006/0269208 A1 | 11/2006 | Allen et al. |
| 2006/0275008 A1 | 12/2006 | Xin |
| 2006/0275009 A1 | 12/2006 | Ellison et al. |
| 2006/0285812 A1 | 12/2006 | Ferris et al. |
| 2007/0003204 A1 | 1/2007 | Makrides-Saravanos et al. |
| 2007/0025070 A1 | 2/2007 | Jiang et al. |
| 2007/0031099 A1 | 2/2007 | Herzog et al. |
| 2007/0033629 A1 | 2/2007 | McGranahan et al. |
| 2007/0047894 A1 | 3/2007 | Holmberg et al. |
| 2007/0104447 A1 | 5/2007 | Allen |
| 2007/0131628 A1 | 6/2007 | Mimlitch et al. |
| 2007/0189692 A1 | 8/2007 | Zimmel et al. |
| 2007/0196071 A1 | 8/2007 | Laursen et al. |
| 2007/0221793 A1 | 9/2007 | Kusuda et al. |
| 2007/0237484 A1 | 10/2007 | Reagan et al. |
| 2007/0274718 A1 | 11/2007 | Bridges et al. |
| 2008/0011514 A1 | 1/2008 | Zheng et al. |
| 2008/0025683 A1 | 1/2008 | Murano |
| 2008/0031585 A1 | 2/2008 | Solheid et al. |
| 2008/0063350 A1 | 3/2008 | Trebesch et al. |
| 2008/0068788 A1 | 3/2008 | Ozawa et al. |
| 2008/0069511 A1 | 3/2008 | Blackwell, Jr. et al. |
| 2008/0069512 A1 | 3/2008 | Barnes et al. |
| 2008/0080826 A1 | 4/2008 | Leon et al. |
| 2008/0080827 A1 | 4/2008 | Leon et al. |
| 2008/0080828 A1 | 4/2008 | Leon et al. |
| 2008/0085094 A1 | 4/2008 | Krampotich |
| 2008/0089656 A1 | 4/2008 | Wagner et al. |
| 2008/0095541 A1 | 4/2008 | Dallesasse |
| 2008/0100440 A1 | 5/2008 | Downie et al. |
| 2008/0106871 A1 | 5/2008 | James |
| 2008/0112681 A1 | 5/2008 | Battey et al. |
| 2008/0118207 A1 | 5/2008 | Yamamoto et al. |
| 2008/0121423 A1 | 5/2008 | Vogel et al. |
| 2008/0124039 A1 | 5/2008 | Gniadek et al. |
| 2008/0131068 A1 | 6/2008 | Mertesdorf et al. |
| 2008/0145013 A1 | 6/2008 | Escoto et al. |
| 2008/0152294 A1 | 6/2008 | Hirano et al. |
| 2008/0166094 A1 | 7/2008 | Bookbinder et al. |
| 2008/0166131 A1 | 7/2008 | Hudgins et al. |
| 2008/0175550 A1 | 7/2008 | Coburn et al. |
| 2008/0175551 A1 | 7/2008 | Smrha et al. |
| 2008/0175552 A1 | 7/2008 | Smrha et al. |
| 2008/0193091 A1 | 8/2008 | Herbst |
| 2008/0205823 A1 | 8/2008 | Luther et al. |
| 2008/0205844 A1 | 8/2008 | Castonguay et al. |
| 2008/0212928 A1 | 9/2008 | Kowalczyk et al. |
| 2008/0219632 A1 | 9/2008 | Smith et al. |
| 2008/0219634 A1 | 9/2008 | Rapp et al. |
| 2008/0236858 A1 | 10/2008 | Quijano |
| 2008/0247723 A1 | 10/2008 | Herzog et al. |
| 2008/0267573 A1 | 10/2008 | Douglas et al. |
| 2008/0285934 A1 | 11/2008 | Standish et al. |
| 2008/0292261 A1 | 11/2008 | Kowalczyk et al. |
| 2008/0298763 A1 | 12/2008 | Appenzeller et al. |
| 2008/0310810 A1 | 12/2008 | Gallagher |
| 2009/0010607 A1 | 1/2009 | Elisson et al. |
| 2009/0016685 A1 | 1/2009 | Hudgins et al. |
| 2009/0022470 A1 | 1/2009 | Krampotich |
| 2009/0060439 A1 | 3/2009 | Cox et al. |
| 2009/0060440 A1 | 3/2009 | Wright et al. |
| 2009/0067800 A1 | 3/2009 | Vazquez et al. |
| 2009/0097813 A1 | 4/2009 | Hill |
| 2009/0136194 A1 | 5/2009 | Barnes |
| 2009/0136196 A1 | 5/2009 | Trebesch et al. |
| 2009/0146342 A1 | 6/2009 | Haney et al. |
| 2009/0148117 A1 | 6/2009 | Laurisch |
| 2009/0169163 A1 | 7/2009 | Abbott, III et al. |
| 2009/0175588 A1 | 7/2009 | Brandt et al. |
| 2009/0180749 A1 | 7/2009 | Douglas et al. |
| 2009/0185782 A1 | 7/2009 | Parikh et al. |
| 2009/0191891 A1 | 7/2009 | Ma et al. |
| 2009/0194647 A1 | 8/2009 | Keith |
| 2009/0196563 A1 | 8/2009 | Mullsteff et al. |
| 2009/0202214 A1 | 8/2009 | Holmberg et al. |
| 2009/0207577 A1 | 8/2009 | Fransen et al. |
| 2009/0208178 A1 | 8/2009 | Kowalczyk et al. |
| 2009/0208210 A1 | 8/2009 | Trojer et al. |
| 2009/0214171 A1 | 8/2009 | Coburn et al. |
| 2009/0220200 A1 | 9/2009 | Sheau Tung Wong et al. |
| 2009/0220204 A1 | 9/2009 | Ruiz |
| 2009/0226142 A1 | 9/2009 | Barnes et al. |
| 2009/0238531 A1 | 9/2009 | Holmberg et al. |
| 2009/0245743 A1 | 10/2009 | Cote et al. |
| 2009/0252472 A1 | 10/2009 | Solheid et al. |
| 2009/0257726 A1 | 10/2009 | Redmann et al. |
| 2009/0257727 A1 | 10/2009 | Laurisch et al. |
| 2009/0257754 A1 | 10/2009 | Theodoras, II et al. |
| 2009/0263096 A1 | 10/2009 | Solheid et al. |
| 2009/0263122 A1 | 10/2009 | Helkey et al. |
| 2009/0267865 A1 | 10/2009 | Miller et al. |
| 2009/0269016 A1 | 10/2009 | Korampally et al. |
| 2009/0269018 A1 | 10/2009 | Frohlich et al. |
| 2009/0274429 A1 | 11/2009 | Krampotich et al. |
| 2009/0274430 A1 | 11/2009 | Krampotich et al. |
| 2009/0274432 A1 | 11/2009 | Iwaya |
| 2009/0290842 A1 | 11/2009 | Bran De Leon et al. |
| 2009/0297111 A1 | 12/2009 | Reagan et al. |
| 2009/0304342 A1 | 12/2009 | Adomeit et al. |
| 2009/0324189 A1 | 12/2009 | Hill et al. |
| 2010/0003000 A1 | 1/2010 | Rapp et al. |
| 2010/0012671 A1 | 1/2010 | Vrondran et al. |
| 2010/0054681 A1 | 3/2010 | Biribuze et al. |
| 2010/0054682 A1 | 3/2010 | Cooke et al. |
| 2010/0054685 A1 | 3/2010 | Cooke et al. |
| 2010/0061693 A1 | 3/2010 | Bran De Leon et al. |
| 2010/0074587 A1 | 3/2010 | Loeffelholz et al. |
| 2010/0080517 A1 | 4/2010 | Cline et al. |
| 2010/0086274 A1 | 4/2010 | Keith |
| 2010/0111483 A1 | 5/2010 | Reinhardt et al. |
| 2010/0119201 A1 | 5/2010 | Smrha et al. |
| 2010/0142544 A1 | 6/2010 | Chapel et al. |
| 2010/0142910 A1 | 6/2010 | Hill et al. |
| 2010/0150518 A1 | 6/2010 | Leon et al. |
| 2010/0158467 A1 | 6/2010 | Hou et al. |
| 2010/0166377 A1 | 7/2010 | Nair et al. |
| 2010/0178022 A1 | 7/2010 | Schroeder et al. |
| 2010/0202745 A1 | 8/2010 | Sokolowski et al. |
| 2010/0220967 A1 | 9/2010 | Cooke et al. |
| 2010/0278499 A1 | 11/2010 | Mures et al. |
| 2010/0296790 A1 | 11/2010 | Cooke et al. |
| 2010/0310225 A1 | 12/2010 | Anderson et al. |
| 2010/0310226 A1 | 12/2010 | Wakileh et al. |
| 2010/0316334 A1 | 12/2010 | Kewitsch |
| 2010/0322582 A1 | 12/2010 | Cooke et al. |
| 2010/0322583 A1 | 12/2010 | Cooke et al. |
| 2011/0073730 A1 | 3/2011 | Kitchen |
| 2011/0085774 A1 | 4/2011 | Murphy et al. |
| 2011/0085776 A1 | 4/2011 | Biribuze et al. |
| 2011/0097053 A1 | 4/2011 | Smith et al. |

(56) References Cited

U.S. PATENT DOCUMENTS

| | | |
|---|---|---|
| 2011/0097977 A1 | 4/2011 | Bubnick et al. |
| 2011/0280537 A1 | 11/2011 | Cowen et al. |
| 2012/0051707 A1 | 3/2012 | Barnes et al. |
| 2012/0183263 A1 | 7/2012 | Wu |
| 2013/0077927 A1 | 3/2013 | O'Connor |

FOREIGN PATENT DOCUMENTS

| | | |
|---|---|---|
| CH | 688705 A5 | 1/1998 |
| DE | 8711970 U1 | 10/1987 |
| DE | 3726718 A1 | 2/1989 |
| DE | 3726719 A1 | 2/1989 |
| DE | 4030301 A1 | 3/1992 |
| DE | 4231181 C1 | 8/1993 |
| DE | 20115940 U1 | 1/2002 |
| DE | 10338848 A1 | 3/2005 |
| DE | 202005009932 U1 | 11/2005 |
| EP | 0250900 A2 | 1/1988 |
| EP | 0408266 A2 | 1/1991 |
| EP | 0474091 A1 | 8/1991 |
| EP | 0468671 A1 | 1/1992 |
| EP | 0490698 A1 | 6/1992 |
| EP | 0529830 A1 | 3/1993 |
| EP | 0544004 A1 | 6/1993 |
| EP | 0547778 A1 | 6/1993 |
| EP | 0581527 A1 | 2/1994 |
| EP | 0620462 A1 | 10/1994 |
| EP | 0693699 A1 | 1/1996 |
| EP | 0720322 A2 | 7/1996 |
| EP | 0940700 A2 | 9/1999 |
| EP | 0949522 A2 | 10/1999 |
| EP | 1041417 A2 | 10/2000 |
| EP | 1056177 A1 | 11/2000 |
| EP | 1065542 A1 | 1/2001 |
| EP | 1203974 A2 | 5/2002 |
| EP | 1289319 A2 | 3/2003 |
| EP | 1316829 A2 | 6/2003 |
| EP | 1777563 A1 | 4/2007 |
| FR | 2378378 A1 | 8/1978 |
| GB | 2241591 A | 9/1991 |
| GB | 2277812 A | 11/1994 |
| JP | 3172806 A | 7/1991 |
| JP | 5045541 A | 2/1993 |
| JP | 06018749 A | 1/1994 |
| JP | 7308011 A | 11/1995 |
| JP | 8007308 A | 1/1996 |
| JP | 8248235 A | 9/1996 |
| JP | 8248237 A | 9/1996 |
| JP | 3487946 A | 10/1996 |
| JP | 8254620 A | 10/1996 |
| JP | 3279474 A | 10/1997 |
| JP | 9258033 A | 10/1997 |
| JP | 9258055 A | 10/1997 |
| JP | 2771870 B2 | 7/1998 |
| JP | 3448448 A | 8/1998 |
| JP | 10227919 A | 8/1998 |
| JP | 3478944 A | 12/1998 |
| JP | 10332945 A | 12/1998 |
| JP | 10339817 A | 12/1998 |
| JP | 11023858 A | 1/1999 |
| JP | 2000098138 A | 4/2000 |
| JP | 2000098139 A | 4/2000 |
| JP | 2000241631 A | 9/2000 |
| JP | 2001004849 A | 1/2001 |
| JP | 3160322 B2 | 4/2001 |
| JP | 2001133636 A | 5/2001 |
| JP | 3173962 B2 | 6/2001 |
| JP | 3176906 B2 | 6/2001 |
| JP | 2001154030 A | 6/2001 |
| JP | 2001159714 A | 6/2001 |
| JP | 2002022974 A | 1/2002 |
| JP | 2002169035 A | 6/2002 |
| JP | 3312893 B2 | 8/2002 |
| JP | 2002305389 A | 10/2002 |
| JP | 3344701 B2 | 11/2002 |
| JP | 2003029054 A | 1/2003 |
| JP | 3403573 B2 | 5/2003 |
| JP | 2003169026 A | 6/2003 |
| JP | 2003215353 A | 7/2003 |
| JP | 2003344701 A | 12/2003 |
| JP | 3516765 B2 | 4/2004 |
| JP | 2004144808 A | 5/2004 |
| JP | 2004514931 A | 5/2004 |
| JP | 3542939 B2 | 7/2004 |
| JP | 2004246147 A | 9/2004 |
| JP | 2004361652 A | 12/2004 |
| JP | 2004361893 A | 12/2004 |
| JP | 3107704 U | 2/2005 |
| JP | 2005055748 A | 3/2005 |
| JP | 2005062569 A | 3/2005 |
| JP | 2005084241 A | 3/2005 |
| JP | 2005148327 A | 6/2005 |
| JP | 3763645 B2 | 4/2006 |
| JP | 3778021 B2 | 5/2006 |
| JP | 2006126513 A | 5/2006 |
| JP | 2006126516 A | 5/2006 |
| JP | 3794540 B2 | 7/2006 |
| JP | 2006227041 A1 | 8/2006 |
| JP | 3833638 B2 | 10/2006 |
| JP | 3841344 B2 | 11/2006 |
| JP | 3847533 B2 | 11/2006 |
| JP | 200747336 A | 2/2007 |
| JP | 3896035 B2 | 3/2007 |
| JP | 2007067458 A | 3/2007 |
| JP | 3934052 B2 | 6/2007 |
| JP | 3964191 B2 | 8/2007 |
| JP | 3989853 B2 | 10/2007 |
| JP | 4026244 B2 | 12/2007 |
| JP | 4029494 B2 | 1/2008 |
| JP | 4065223 B2 | 3/2008 |
| JP | 4093475 B2 | 6/2008 |
| JP | 4105696 B2 | 6/2008 |
| JP | 4112437 B2 | 7/2008 |
| JP | 4118862 B2 | 7/2008 |
| JP | 2008176118 A1 | 7/2008 |
| JP | 2008180817 A1 | 8/2008 |
| JP | 4184329 B2 | 11/2008 |
| JP | 2008542822 T | 11/2008 |
| JP | 2009503582 T | 1/2009 |
| WO | 9105281 A1 | 4/1991 |
| WO | 9326070 A1 | 12/1993 |
| WO | 9520175 A1 | 7/1995 |
| WO | 9636896 A1 | 11/1996 |
| WO | 9712268 A1 | 4/1997 |
| WO | 9744605 A1 | 11/1997 |
| WO | 9825416 A1 | 6/1998 |
| WO | 0005611 A2 | 2/2000 |
| WO | 0127660 A2 | 4/2001 |
| WO | 0242818 A1 | 5/2002 |
| WO | 03009527 A2 | 1/2003 |
| WO | 2004052066 A1 | 6/2004 |
| WO | 2007050515 A1 | 5/2007 |
| WO | 2007079074 A2 | 7/2007 |
| WO | 2007149215 A2 | 12/2007 |
| WO | 2008063054 A2 | 5/2008 |
| WO | 2009120280 A2 | 10/2009 |

OTHER PUBLICATIONS

Patent Cooperation Treaty, International Search Report for PCT/US2011/057579, Feb. 14, 2012, 11 pages.
Annex to Form PCT/ISA/2006, Communication Relating to the Results of the Partial International Search, for PCT/US2009/004549 mailed Feb. 10, 2010, 2 pages.
Annex to Form PCT/ISA/206, Communication Relating to the Results of the Partial International Search, for PCT/US2009/004548 mailed Jan. 19, 2010, 2 pages.
Corning Cable Systems, "Corning Cable Systems Products for BellSouth High Density Shelves," Jun. 2000, 2 pages.
Corning Cable Systems, "Corning Cable Systems Quick Reference Guide for Verizon FTTP FDH Products," Jun. 2005, 4 pages.
Conner, M. "Passive Optical Design for RFOG and Beyond," Braodband Properties, Apr. 2009, pp. 78-81.

(56) References Cited

OTHER PUBLICATIONS

Corning Evolant, "Eclipse Hardware Family," Nov. 2009, 1 page.
Corning Evolant, "Enhanced Management Frame," Dec. 2009, 1 page.
Corning Evolant, "Enhanced Management Frame (EMF)," Specification Sheet, Nov. 2009, 24 pages.
Corning Cable Systems, "Evolant Solutions for Evolving Networks: Fiber Optic Hardware," Oct. 2002, 2 pages.
Corning Cable Systems, "Fiber Optic Hardware with Factory-Installed Pigtails: Features and Benefits," Nov. 2010, 12 pages.
Corning Cable Systems, "FiberManager System 1- and 3-Position Compact Shelves," Jan. 2003, 4 pages.
Corning Cable Systems, "FiberManager System Frame and Components," Jan. 2003, 12 pages.
Corning Cable Systems, "High Density Frame," Jul. 2001, 2 pages.
Corning Cable Systems, "High Density Frame (HDF) Connector-Splice Shelves and Housings," May 2003, 4 pages.
International Search Report for PCT/US10/35529 mailed Jul. 23, 2010, 2 pages.
International Search Report for PCT/US10/35563 mailed Jul. 23, 2012, 1 page.
International Search Report for PCT/US2008/002514 mailed Aug. 8, 2008, 2 pages.
International Search Report for PCT/US2008/010317 mailed Mar. 4, 2008, 2 pages.
International Search Report for PCT/US2009/001692 mailed Nov. 24, 2009, 5 pages.
International Search Report for PCT/US2010/024888 mailed Jun. 23, 2010, 5 pages.
International Search Report for PCT/US2010/027402 mailed Jun. 16, 2010, 2 pages.
Corning Cable Systems, "MTX Frames and Accessories," Feb. 2006, 4 pages.
Panduit, "Lock-in LC Duplex Clip," Accessed Mar. 22, 2012, 1 page.
International Search Report for PCT/US06/49351 mailed Apr. 25, 2008, 1 page.
International Search Report for PCT/US09/57069 mailed Mar. 24, 2010, 2 pages.
International Search Report for PCT/US2009/057244 mailed Nov. 9, 2009 3 pages.
International Search Report for PCTUS2009004548 mailed Mar. 19, 2010, 5 pages.
International Search Report for PCTUS2009004549 mailed Apr. 20, 2010, 6 pages.
Siecor, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
Written Opinion for PCT/US2010/023901 mailed Aug. 25, 2011, 8 pages.
Advisory Action for U.S. Appl. No. 12/221,117 mailed Aug. 24, 2011, 3 pages.
Examiner's Answer to Appeal Brief for U.S. Appl. No. 12/221,117 mailed Mar. 29, 2012, 16 pages.
Final Office Action for U.S. Appl. No. 12/221,117 mailed Feb. 19, 2010, 7 pages.
Final Office Action for U.S. Appl. No. 12/221,117 mailed Jun. 10, 2011, 8 pages.
Non-final Office Action for U.S. Appl. No. 12/221,117 mailed Jul. 14, 2010, 7 pages.
Non-final Office Action for U.S. Appl. No. 12/221,117 mailed Jun. 9, 2009, 5 pages.
Non-final Office Action for U.S. Appl. No. 12/221,117 mailed Dec. 21, 2010, 7 pages.
Advisory Action for U.S. Appl. No. 12/394,483 mailed Feb. 16, 2012, 3 pages.
Final Office Action for U.S. Appl. No. 12/394,483 mailed Dec. 6, 2011, 14 pages.
Non-final Office Action for U.S. Appl. No. 12/394,483 mailed Jun. 17, 2011, 11 pages.
Advisory Action for U.S. Appl. No.12/950,234 mailed Dec. 21, 2011, 3 pages.
Non-final Office Action for U.S. Appl. No. 12/950,234 mailed Jun. 17, 2011, 7 pages.
Non-final Office Action for U.S. Appl. No. 12/950,234 mailed Mar. 12, 2012, 10 pages.
Final Office Action for U.S. Appl. No. 12/950,234 mailed Oct. 14, 2011, 10 pages.
Advisory Action mailed May 12, 2011, for U.S. Appl. No.. 121323,423, 3 pages.
Final Rejection mailed Mar. 3, 2011, for U.S. Appl. No. 12/323,423, 17 pages.
Non-Final Rejection mailed Aug. 5, 2011, for U.S. Appl. No. 12/323,423, 13 pages.
Final Office Action for U.S. Appl. No. 121394,114 mailed Oct. 25, 2012, 8 pages.
Non-final Office Action for U.S. Appl. No. 12/915,682 mailed Oct. 24, 2012, 8 pages.
Non-final Office Action for U.S. Appl. No. 12/818,986 mailed Feb. 3, 2012, 12 pages.
Final Office Action for U.S. Appl. No. 121818,986 mailed Oct. 18, 2012, 13 pages.
Non-final Office Action for U.S. Appl. No. 12/952,960 mailed Oct. 4, 2012, 11 pages.
Non-final Office Action for U.S. Appl. No. 12/953,134 mailed Sep. 25, 2012, 8 pages.
Non-final Office Action for U.S. Appl. No. 12/953,039 mailed Jan. 11, 2013, 6 pages.
Non-final Office Action for U.S. Appl. No. 12/952,912 mailed Dec. 28, 2012, 9 pages.
Non-final Office Action for U.S. Appl. No. 12/953,118 mailed Jan. 7, 2013, 9 pages.
Non-final Office Action for U.S. Appl. No. 12/953,536 mailed Jan. 2, 2013, 20 pages.
Non-final Office Action for U.S. Appl. No. 12/707,889 mailed Jan. 2, 2013, 7 pages.
European Search Report for patent application 10790017.7 mailed Nov. 8, 2012, 7 pages.
Examination Report for European patent application 09789090.9-2216 mailed Aug. 29, 2011, 4 pages.
Examination Report for European patent application 09789090.9-2216 mailed Mar. 30, 2012, 6 pages.
Written Opinion of the International Searching Authority for International patent application PCT/US2009004548, mailed Apr. 5, 2011, 6 pages.
European Search Report for European patent application 09789090.9-2217 mailed Jan. 24, 2013, 5 pages.
Non-final Office Action for U.S. Appl. No. 12/946,139 mailed Jul. 26, 2012, 12 pages.
Final Office Action for U.S. Appl. No. 12/946,139 mailed Feb. 15, 2013, 17 pages.
Non-final Office Action for U.S. Appl. No. 12/751,884 mailed Feb. 15, 2013, 5 pages.
Non-final Office Action for U.S. Appl. No. 12/394,114 mailed Feb. 27, 2013, 8 pages.
Non-final Office Action for U.S. Appl. No. 12/819,065 mailed Mar. 4, 2013, 7 pages.
Final Office Action for U.S. Appl. No. 12/952,960 mailed Mar. 7, 2013, 13 pages.
Notice of Allowance for U.S. Appl. No. 12/732,487 mailed Mar. 19, 2013, 11 pages.
Non-final Office Action for U.S. Appl. No. 12/953,134 mailed Mar. 21, 2013, 9 pages.
Final Office Action for U.S. Appl. No. 12/641,617 mailed May 10, 2013, 21 pages.
Notice of Allowance for U.S. Appl. No. 13/090,621 mailed Apr. 22, 2013, 8 pages.

(56) References Cited

OTHER PUBLICATIONS

Final Office Action for U.S. Appl. No. 12/953,039 mailed May 1, 2013, 8 pages.
Final Office Action for U.S. Appl. No. 12/953,118 mailed May 3, 2013, 11 pages.
Final Office Action for U.S. Appl. No. 12/915,682 mailed Apr. 18, 2013, 9 pages.
Advisory Action for U.S. Appl. No. 12/952,960 mailed May 15, 2013, 2 pages.
Non-final Office Action for U.S. Appl. No. 12/952,960 mailed Jun. 20, 2013, 13 pages.
Non-final Office Action for U.S. Appl. No. 12/953,536 mailed Jun. 6, 2013, 21 pages.
Final Office Action for U.S. Appl. No. 12/871,052 mailed Jul. 1, 2013, 12 pages.
Non-final Office Action for U.S. Appl. No. 12/940,699 mailed Jun. 26, 2013, 9 pages.
Notice of Allowance for U.S. Appl. No. 13/090,621 mailed Jun. 25, 2013, 8 pages.
Non-final Office Action for U.S. Appl. No. 13/302,067 mailed Jun. 7, 2013, 13 pages.
Final Office Action for U.S. Appl. No. 12/771,473 mailed Jul. 19, 2013, 7 pages.
Notice of Allowance for U.S. Appl. No. 12/751,884 mailed Jul. 17, 2013, 8 pages.
Non-final Office Action for U.S. Appl. No. 12/940,585 mailed Aug. 16, 2013, 14 pages.
Final Office Action for U.S. Appl. No. 12/953,134 mailed Aug. 23, 2013, 11 pages.
Ex parte Quayle Action for U.S. Appl. No. 12/953,164 mailed Aug. 16, 2013, 5 pages.
Non-final Office Action for U.S. Appl. No. 12/732,487 mailed Jul. 17, 2013, 22 pages.
Non-final Office Action and Interview Summary for U.S. Appl. No. 121707,889 mailed Aug. 8, 2013, 15 pages.
Advisory Action for U.S. Appl. No. 12/953,039 mailed Jul. 12, 2013, 3 pages.
Advisory Action for U.S. Appl. No. 12/953,118 mailed Jul. 12, 2013, 3 pages.
Advisory Action for U.S. Appl. No. 12/641,617 mailed Jul. 29, 2013, 3 pages.
Non-Final Rejection mailed Sep. 7, 2010, for U.S. Appl. No. 12/323,423, 18 pages.
Notice of Allowance for U.S. Appl. No. 12/323,423 mailed Jan. 24, 2012, 8 pages.
Examiner's Answer mailed Mar. 4, 2011, for U.S. Appl. No. 12/323,415, 11 pages.
Final Rejection mailed Jun. 25, 2010, for U.S. Appl. No. 12/323,415, 10 pages.
Non-Final Rejection mailed Aug. 5, 2011, for U.S. Appl. No. 12/323,415, 41 pages.
Non-final Office Action for U.S. Appl. No. 12/323,415 mailed Apr. 23, 2012, 11 pages.
Non-Final Rejection mailed Dec. 10, 2009, for U.S. Appl. No. 12/323,415, 7 pages.
Examiner's Answer to Appeal Brief for U.S. Appl. No. 11/320,062 mailed Dec. 8, 2011, 8 pages.
Final Office Action for U.S. Appl. No. 11/320,062 mailed Mar. 8, 2011, 8 pages.
Non-final Office Action for U.S. Appl. No. 11/320,062 mailed Jan. 15, 2010, 11 pages.
Non-final Office Action for U.S. Appl. No. 12/320,062 mailed Sep. 30, 2010, 7 pages.
Final Office Action for U.S. Appl. No. 11/439,086 mailed Feb. 4, 2010, 14 pages.
Non-final Office Action for U.S. Appl. No. 11/439,086 mailed May 3, 2010, 11 pages.
Non-final Office Action for U.S. Appl. No. 11/439,086 mailed Sep. 21, 2009, 10 pages.
Final Office Action for U.S. Appl. No. 12/079,481 mailed Mar. 18, 2010, 10 pages.
Non-final Office Action for U.S. Appl. No. 12/079,481 mailed Dec. 26, 2008, 9 pages.
Non-final Office Action for U.S. Appl. No. 12/079,481 mailed Sep. 16, 2009, 10 pages.
Notice of Allowance for U.S. Appl. No. 12/079,481 mailed Jun. 3, 2010, 6 pages.
Notice of Allowance for U.S. Appl. No. 12/079,481 mailed Oct. 4, 2010, 4 pages.
Final Office Action for U.S. Appl. No. 12/394,114 mailed Dec. 22, 2011, 8 pages.
Non-final Office Action for U.S. Appl. No. 12/394,114 mailed Mar. 16, 2012, 8 pages.
Non-final Office Action for U.S. Appl. No. 12/394,114 mailed Sep. 1, 2011, 7 pages.
Non-final Office Action for U.S. Appl. No. 12/323,373 mailed May 3, 2012, 7 pages.
Non-final Office Action for U.S. Appl. No. 11/809,474 mailed Apr. 8, 2008, 13 pages.
Non-final Office Action for U.S. Appl. No. 11/809,474 mailed Nov. 13, 2008, 10 pages.
Notice of Allowance for U.S. Appl. No. 11/809,474 mailed Jul. 6, 2009, 6 pages.
Final Office Action for U.S. Appl. No. 11/320,031 mailed Mar. 8, 2011, 8 pages.
Non-final Office Action for U.S. Appl. No. 11/320,031 mailed Jan. 5, 2010, 16 pages.
Non-final Office Action for U.S. Appl. No. 11/320,031 mailed Sep. 30, 2010, 7 pages.
Notice of Allowance for U.S. Appl. No. 11/320,031 mailed Nov. 15, 2011, 7 pages.
Non-final Office Action for U.S. Appl. No. 12/157,622 mailed Mar. 31, 2009, 9 pages.
Non-final Office Action for U.S. Appl. No. 12/157,622 mailed Oct. 15, 2009, 9 pages.
Notice of Allowance for U.S. Appl. No. 12/157,622 mailed Apr. 22, 2010, 4 pages.
Non-final Office Action for U.S. Appl. No. 12/323,395 mailed Dec. 8, 2011, 7 pages.
Non-final Office Action for U.S. Appl. No. 12/415,454 mailed Mar. 2, 2012, 5 pages.
Non-final Office Action for U.S. Appl. No. 12/415,454 mailed Sep. 6, 2011, 7 pages.
Notice of Allowance for U.S. Appl. No. 12/415,454 mailed Jan. 13, 2012, 5 pages.
Non-final Office Action for U.S. Appl. No. 12/576,769 mailed Feb. 2, 2012, 23 pages.
Notice of Allowance for U.S. Appl. No. 12/415,454 mailed Jun. 19, 2012, 5 pages.
International Search Report for PCT/US2010/023901 mailed Jun. 11, 2010, 3 pages.
Notice of Allowance for U.S. Appl. No. 12/576,769 mailed May 31, 2012, 9 pages.
Non-final Office Action for U.S. Appl. No. 12/576,806 mailed Dec. 13, 2011, 6 pages.
Notice of Allowance for U.S. Appl. No. 12/576,806 mailed Apr. 18, 2012, 5 pages.
Unknown, Author, "QuickNet SFQ Series MTP Fiber Optic Cassettes," Panduit Specification Sheet, Jan. 2009, 2 pages.
Unknown Author, "Cellular Specialties introduces the first simulated in-building location-based tracking solution," smart-grid.tmenet.com/news, Sep. 14, 2009, 2 pages.
Unknown Author, "CDMA Co-Pilot Transmitter," Cellular Specialties, Inc., Aug. 2009, 2 pages.
International Search Report for PCT/US2010/038986 mailed Aug. 18, 2010, 1 page.
International Search Report for PCT/US2009/066779 mailed Aug. 27, 2010, 3 pages.
"MPO Fiber Optic Rack Panels now available from L-com Connectivity Products," article dated Jun. 4, 2007, 16 pages., http://www.I-com.com/content/Article.aspx?Type=P&ID=438.

(56) References Cited

OTHER PUBLICATIONS

"19" Rack Panel with 16 MPO Fiber Optic Couplers—1U high, product page, accessed Oct. 23, 2012, 2 pages, http://www.I-com.com/item.aspx?id=9767#.UIbgG8XXay5.

"Drawing for L-com 1U Panel with 16 MTP couplers," May 15, 2007, 1 page, http://www.1-com.com/multimedia/eng_drawings/PR17516MTP.pdf.

"RapidNet Fibre MTP VHD Cassette," Brochure, Date Unknown, 1 page, http://www.hellermanntyton.se/documents/5000/576_fiber_1U.pdf.

"MPO for Gigabit Ethernet/FAS-NET MTP Solution," Brochure, Date Unknown, 11 pages, http://Iwww.infinique.com/upload/13182286190.pdf.

"Hubbell OptiChannel High Density 144 Port 1U Fiber Enclosure," Brochure, Date Unknown, 2 pages, http://www.hubbell-premise.com/literature/PLDF010.pdf.

Non-final Office Action for U.S. Appl. No. 12/771,473 mailed Oct. 4, 2012, 6 pages.

Non-final Office Action for U.S. Appl. No. 12/819,081 mailed Aug. 21, 2012, 12 pages.

Notice of Allowance for U.S. Appl. No. 12/417,325 mailed Aug. 22, 2012, 7 pages.

Notice of Panel Decision for Pre-Appeal Brief for U.S. Appl. No. 12/417,325 mailed Aug. 8, 2012, 2 pages.

Advisory Action for U.S. Appl. No. 12/417,325 mailed Jun. 29, 2012, 3 pages.

Advisory Action for U.S. Appl. No. 12/417,325 mailed Jun. 12, 2012, 3 pages.

Final Office Action for U.S. Appl. No. 12/417,325 mailed Apr. 16, 2012, 6 pages.

Final Office Action for U.S. Appl. No. 12/417,325 mailed Feb. 7, 2012, 7 pages.

Non-final Office Action for U.S. Appl. No. 12/417,325 mailed Jun. 15, 2011, 6 pages.

Notice of Allowance for U.S. Appl. No. 12/487,929 mailed Sep. 12, 2012, 4 pages.

Notice of Allowance for U.S. Appl. No. 12/487,929 mailed Jun. 13, 2012, 8 pages.

Advisory Action for U.S. Appl. No. 12/487,929 mailed Apr. 17, 2012, 3 pages.

Final Office Action for U.S. Appl. No. 12/487,929 mailed Feb. 14, 2012, 6 pages.

Final Office Action for U.S. Appl. No. 12/487,929 mailed Dec. 5, 2011, 7 pages.

Non-final Office Action for U.S. Appl. No. 12/487,929 mailed May 23, 2011, 7 pages.

Notice of Allowance for U.S. Appl. No. 12/415,253 mailed Mar. 11, 2011, 7 pages.

Non-final Office Action for U.S. Appl. No. 12/415,253 mailed Jul. 12, 2010, 11 pages.

Final Office Action for U.S. Appl. No. 12/415,253 mailed Apr. 16, 2010, 9 pages.

Non-final Office Action for U.S. Appl. No. 12/415,253 mailed Sep. 30, 2009, 8 pages.

Non-final Office Action for U.S. Appl. No. 12/641,617 mailed Oct. 5, 2012, 21 pages.

Final Office Action for U.S. Appl. No. 12/630,938 mailed Jun. 1, 2012, 18 pages.

Non-final Office Action for U.S. Appl. No. 12/630,938 mailed Dec. 19, 2011, 15 pages.

Non-final Office Action for U.S. Appl. No. 12/751,884 mailed Jul. 2, 2012, 9 pages.

Non-final Office Action for U.S. Appl. No. 12/871,052 mailed Aug. 13, 2012, 8 pages.

Final Office Action for U.S. Appl. No. 12/952,912 mailed Aug. 30, 2013, 15 pages.

Advisory Action for U.S. Appl. No. 12/771,473 mailed Oct. 2, 2013, 3 pages.

Notice of Allowance for U.S. Appl. No. 12/641,617 mailed Sep. 4, 2013, 9 pages.

Notice of Allowance for U.S. Appl. No. 12/871,052 mailed Sep. 18, 2013, 9 pages.

Non-final Office Action for U.S. Appl.No. 12/953,039 mailed Sep. 12, 2013, 8 pages.

Non-final Office Action for U.S. Appl.No. 12/946,139 mailed Oct. 2, 2013, 18 pages.

Final Office Action for U.S. Appl.No. 12/394,114 mailed Oct. 4, 2013, 10 pages.

Non-final Office Action for U.S. Appl.No. 12/818,986 mailed Oct. 4, 2013, 19 pages.

Advisory Action for U.S. Appl.No. 12/953,134 mailed Nov. 4, 2013, 3 pages.

Notice of Allowance for U.S. Appl.No. 13/292,130 mailed Oct. 18, 2013, 9 pages.

Non-final Office Action for U.S. Appl.No. 13/901,074 mailed Oct. 9, 2013, 6 pages.

Final Office Action for U.S. Appl.No. 12/952,960 mailed Oct. 29, 2013, 8 pages.

Non-final Office Action for U.S. Appl.No. 12/956,446 mailed Sep. 6, 2013, 10 pages.

\* cited by examiner

FIBER OPTIC CONNECTOR EMPLOYING OPTICAL FIBER GUIDE MEMBER

FIELD

The present disclosure relates generally to fiber optic connectors, and in particular relates to fiber optic connectors that employ an optical fiber guide member configured to protect at least one optical fiber during connector assembly.

BACKGROUND

Optical fiber is used for a variety of telecommunications applications, such as broadband voice, video, and data transmission. The benefits of optical fiber use include extremely wide bandwidth and low-noise operation. With the increasing and varied use of optical fibers, efficient methods of interconnecting optical fibers are needed. To this end, fiber optic connectors have been developed that do not significantly attenuate or otherwise alter the transmitted optical signal. Such fiber optic connectors need to be relatively rugged and adapted for frequent connection and disconnection to accommodate changes in the optical fiber transmission path. Because of the skill required in making optical fiber connections and the variety of applications and environments in which they are used, fiber optic cables carrying one or more optical fibers are typically pre-connectorized with fiber optic connectors by the fiber optic cable manufacturer before the fiber optic cable is deployed in a telecommunications system. The combined connector and fiber optic cable constitute a cable assembly.

Fiber optic connectors are designed to interconnect single or multiple optical fibers. Assembly of connector housing parts can create the risk of damaging or pinching an optical fiber. In the case of multiple fibers, for one example, a duplex fiber optic cable carries two optical fibers for full duplex communications. One type of duplex fiber optic connector used with a duplex fiber optic cable is an LC fiber optic connector. The LC fiber optic connector comprises a connector housing constituted by two connector housing sections that snap together during connector assembly. Unfortunately, the snap-assembly of the connector housing presents a substantial risk of pinching one or more of the optical fibers, which can damage the optical fibers and cause connection problems.

SUMMARY

An aspect of the disclosure is a fiber optic connector for connecting at least one optical fiber that extends from an end of a fiber optic cable. The connector includes a connector housing having mateable sections. When mated, the housing sections define a housing passage having opposite connector-end, which in an exemplary embodiment may be at a wide-end of the housing, and channel-end portions that define respective connector-end and channel-end passages. The channel-end portion is configured to be arranged adjacent the fiber optic cable end. The connector also includes an optical fiber guide member disposed in the channel-end passage and having a first transition end, which may be a flared end, that faces the connector-end passage. The optical fiber guide member defines a conduit configured to loosely confine and guide the optical fibers from the optical fiber cable end to the connector-end passage. The connector also includes at least one connector sub-assembly operably supported at the housing connector-end portion and configured to respectively support at least one end portion of the optical fiber.

Another aspect of the disclosure is a method of forming a fiber optic cable assembly for first and second optical fibers extending from an end of a duplex fiber optic cable and having respective first and second bare ends. The method includes providing a connector housing having opposing first and second mateable housing sections. The connector housing has opposite connector-end and channel-end portions that define a housing passage having corresponding connector-end and channel-end passages. The method also includes operably arranging first and second connector sub-assemblies at the housing connector-end portion. The method further includes providing an optical fiber guide member having a central conduit and a first transition end, and fixedly disposing the optical fiber guide member in the channel-end passage with the first transition end facing the connector-end passage. The method additionally includes leading the first and second optical fibers from the cable end, through the optical guide member central conduit, out the first transition end, and through the housing passage to the first and second connector sub-assemblies. The method also includes respectively operatively engaging the first and second optical fiber bare ends in the first and second connector sub-assemblies.

Another aspect of the disclosure is an LC fiber optic connector for connecting first and second optical fibers that extend from an end of a duplex fiber optic cable. The connector includes a tapered connector housing having a connector-end portion and a channel-end portion. The connector housing defines a passage from the channel-end portion to the connector-end portion. The connector also includes first and second LC connector sub-assemblies operably arranged at the connector-end portion and configured to respectively support first and second bare ends of the first and second optical fibers. The connector also includes an optical fiber guide member fixedly disposed at the channel-end portion and having a transition end, which may be for example a flared end, that faces the connector-end portion. The optical fiber guide member is sized to loosely confine and guide the first and second optical fibers from the cable end and into to the housing passage for connection to the first and second LC connector sub-assemblies.

Additional features and advantages of the present disclosure are set out in the detailed description that follows, explaining the principles and operations thereof, and will also be readily apparent to those of ordinary skill in the art from the description and/or recognized by practicing the disclosure as described. It is to be understood that the general description above and the detailed description that follows present exemplary embodiments of the disclosure, which are intended to provide an overview and framework for understanding the nature and character of the disclosure as it is claimed. The accompanying drawings are incorporated into and constitute a part of this specification, illustrating and further highlighting the exemplary embodiments of the present disclosure.

These and other advantages of the disclosure will be further understood and appreciated by those skilled in the art by reference to the following written specification, claims and appended drawings.

BRIEF DESCRIPTION OF THE DRAWINGS

A more complete understanding of the present disclosure may be had by reference to the following detailed description when taken in conjunction with the accompanying drawings, wherein.

DETAILED DESCRIPTION

Reference is now made in detail to the embodiments of the present disclosure, examples of which are illustrated in the accompanying drawings. Whenever possible, the same or like reference numbers are used to refer to the same or like components or parts.

Figure 1:
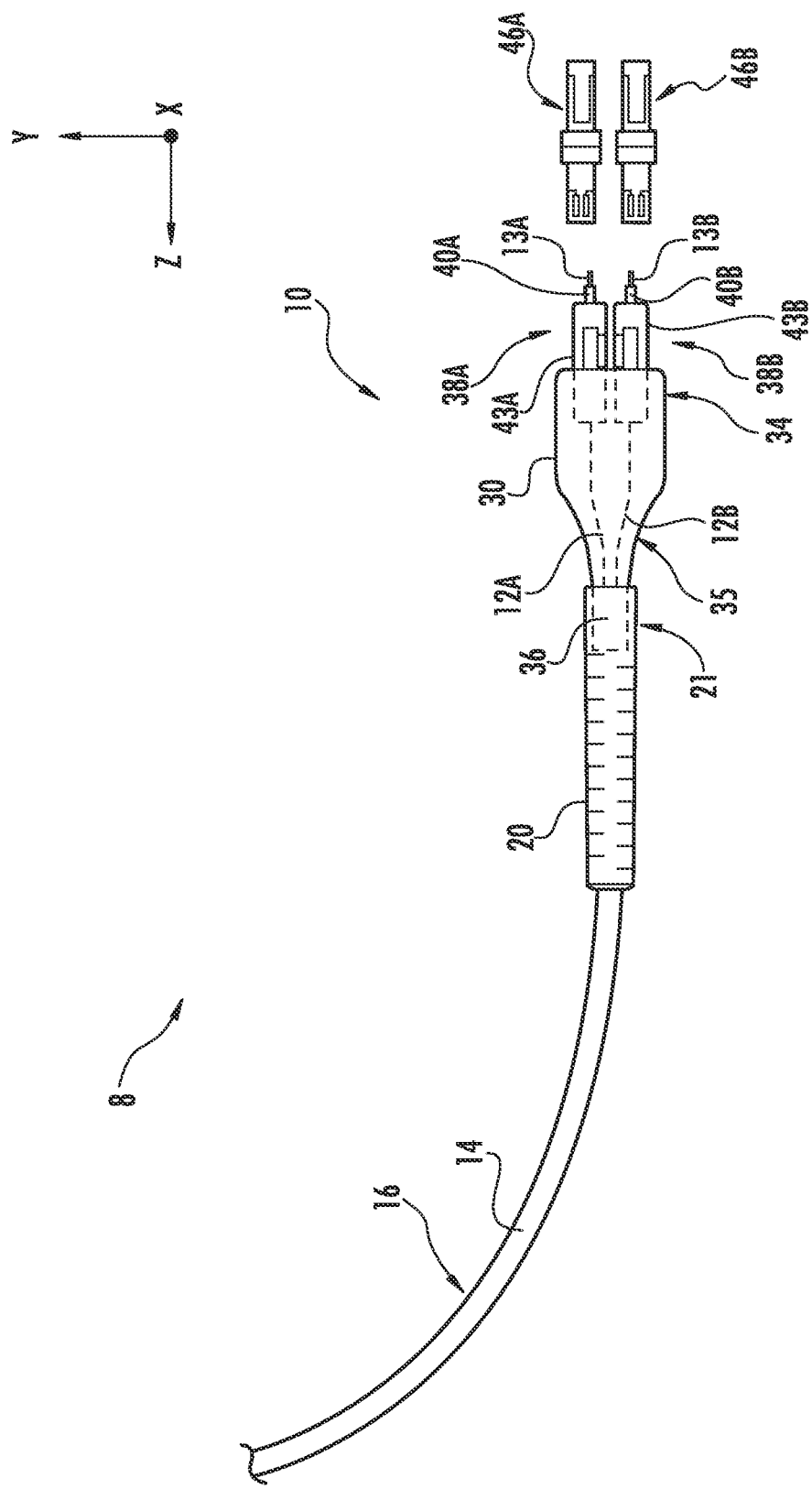
FIG. 1 illustrates an example multi-fiber fiber optic cable assembly that includes a duplex LC fiber optic connector and a duplex fiber optic cable.
Figure 2:
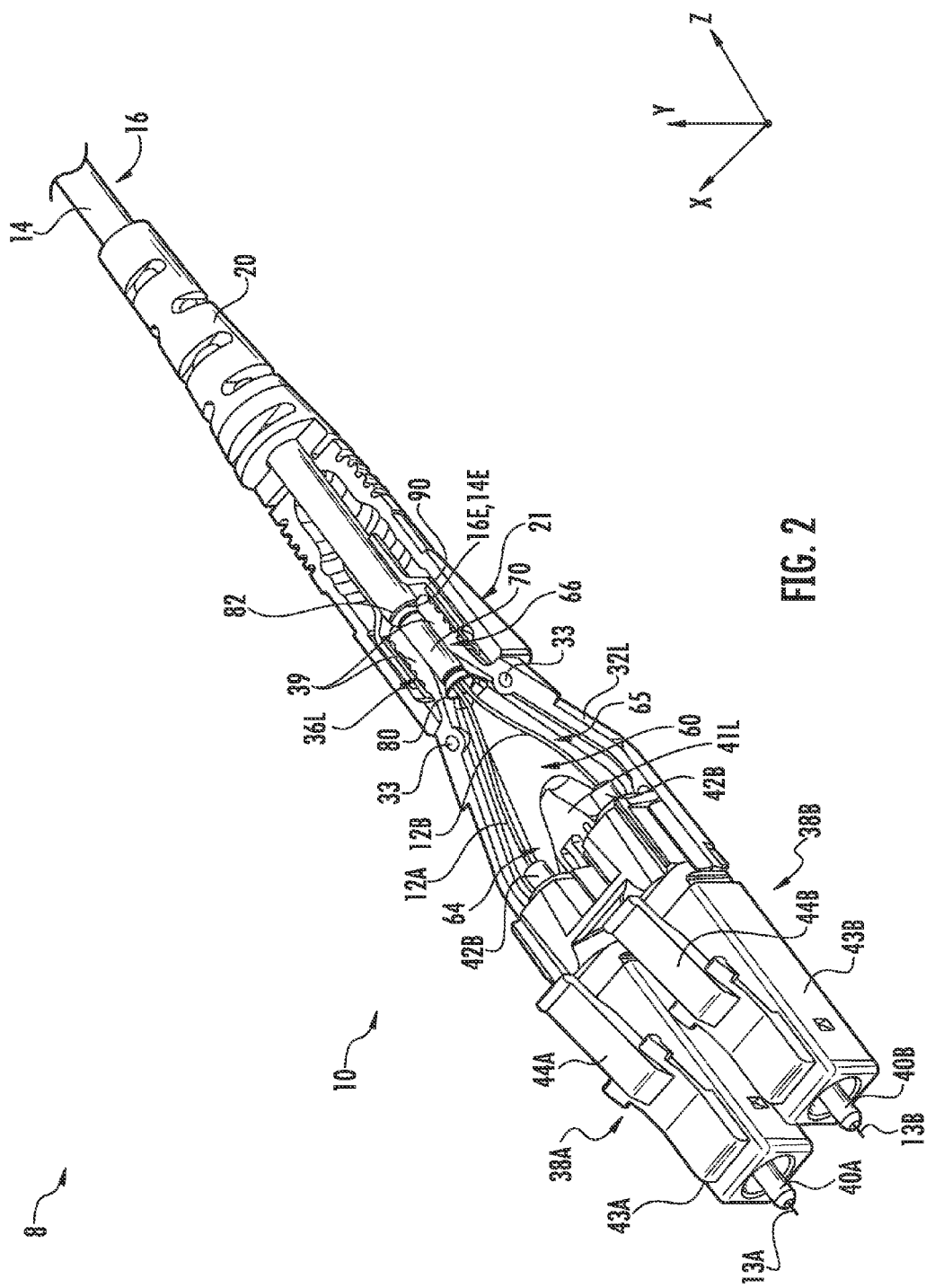
FIG. 2 is a perspective partial cut-away, close-up view of the cable assembly of FIG. 1.
Figure 3:
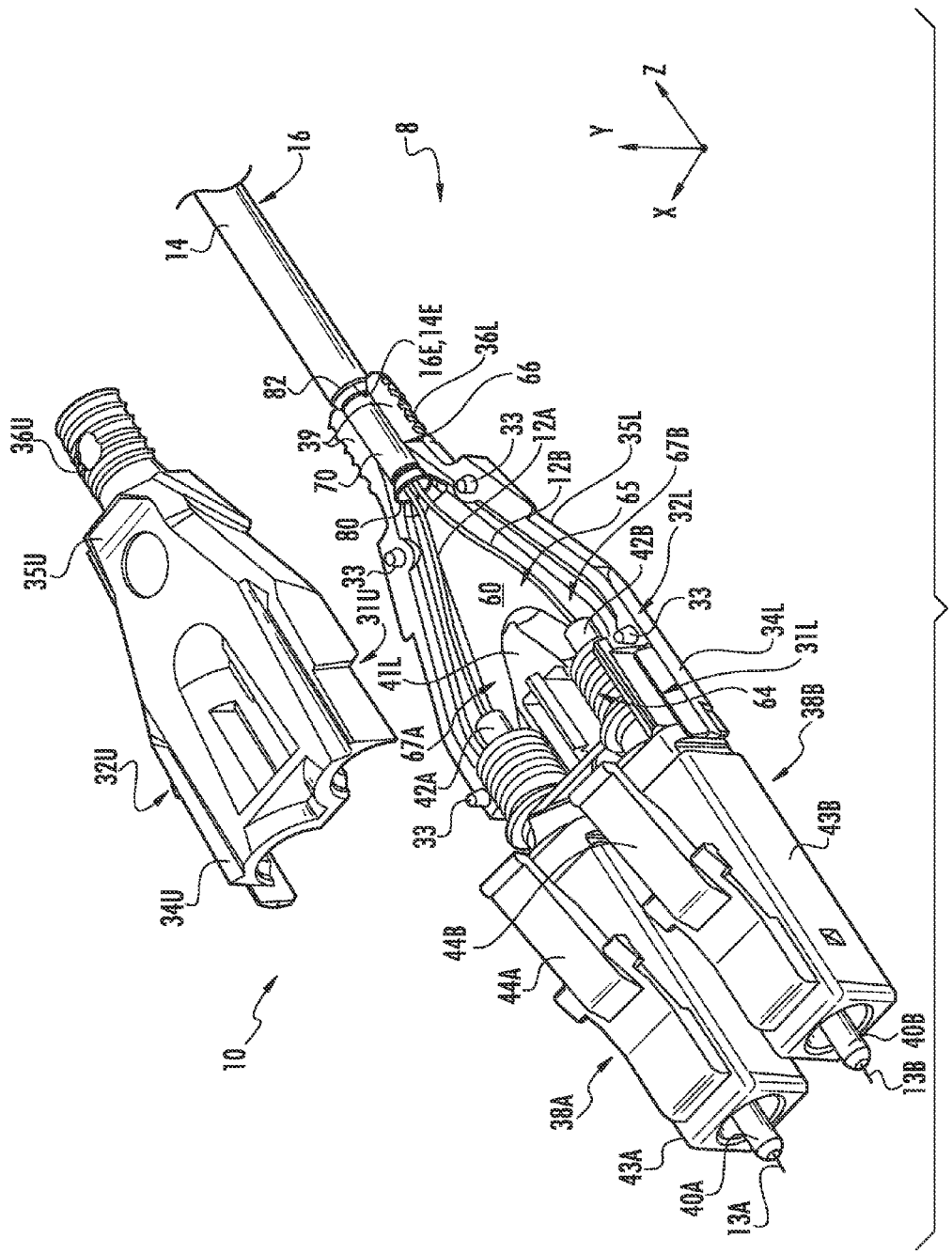
FIG. 3 is similar to FIG. 2 and shows the upper housing section separated from the lower housing section.
Figure 4:
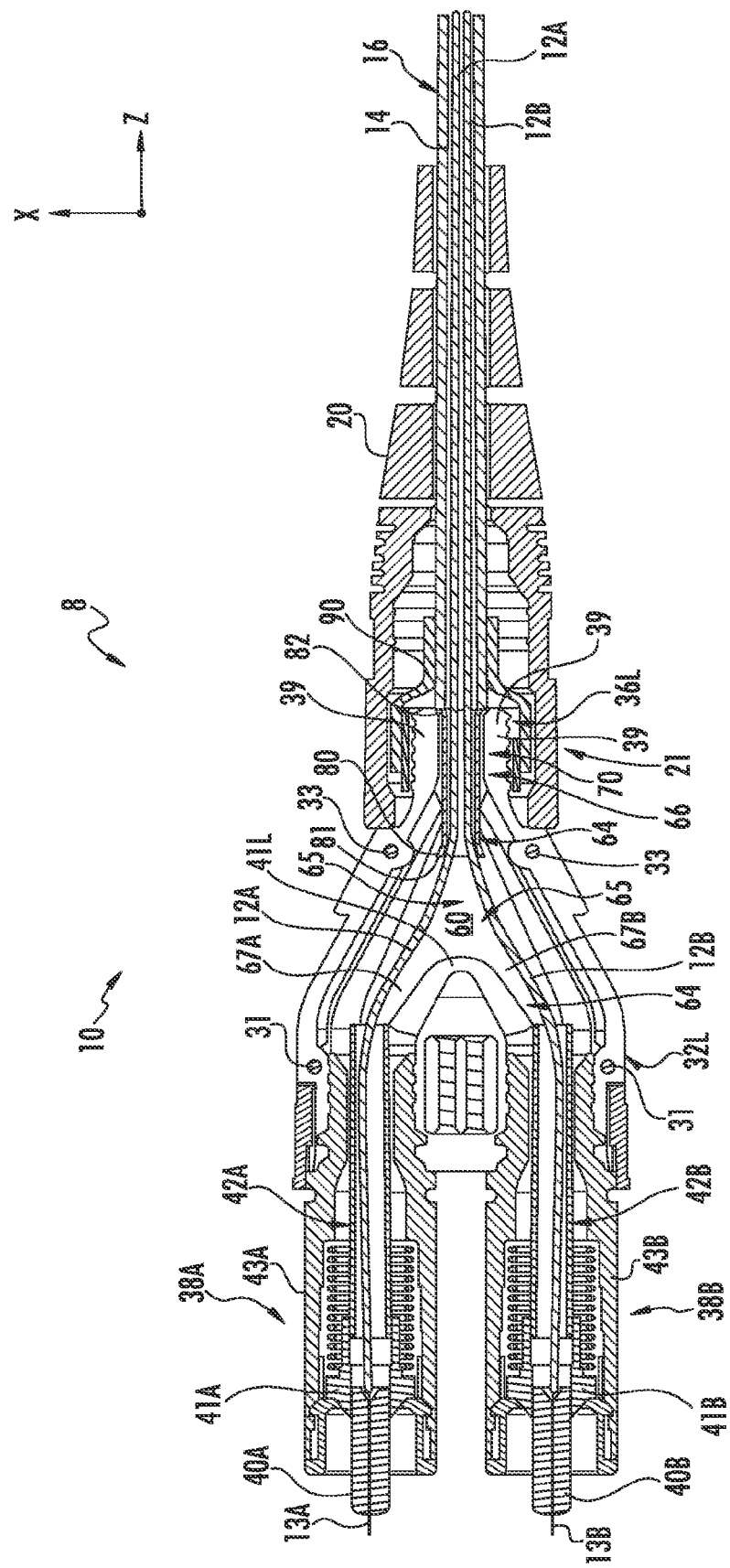
FIG. 4 is an X-Z cross-sectional view of the cable assembly of FIG. 2.

FIG. 1 illustrates an example multi-fiber fiber optic cable assembly ("cable assembly") 8 that includes a duplex LC fiber optic connector ("connector") 10 and a duplex fiber optic cable ("cable") 16. FIG. 2 and FIG. 3 are perspective partial cut-away, close-up views of connector 10 as part of cable assembly 8. FIG. 4 is an X-Z cross-sectional view of the cable assembly 8 of FIG. 2. A two-optical-fiber configuration for cable assembly 8 is shown and discussed herein by way of example. In general, cable assembly 8 can be figured for handling one or more optical fibers.

With reference to FIG. 1 through FIG. 4, connector 10 provides a connection in cable assembly 8 for two optical fibers 12A, 12B enclosed in a cable jacket 14 of cable 16. Cable 16 has an end 16E that corresponds to where cable jacket 14 has an end 14E. Optical fibers 12A, 12B extend from cable 16 at cable end 16E and have respective bare optical fiber end portions ("bare ends") 13A, 13B. In an example, optical fibers 12A, 12B are unbuffered. Further in an example, optical fibers 12A, 12B are bare optical fibers (e.g., 250 micron diameter optical fibers) covered by a sheath.

Cable assembly 8 also includes a flexible boot 20 and connector 10 includes a connector housing 30. Boot 20 includes an end section 21 that covers cable end 16E and that engages a channel-end portion 36 of connector housing 30, as discussed in greater detail below. Boot 20 is configured to prevent sharp bends in cable 16 where the cable engages connector 10.

With reference to FIG. 3, connector housing 30 includes upper and lower housing section 32U, 32L. In an example, upper and lower housing sections 32U, 32L are configured to mate (connect) with one another to form connector housing 30. An example mating configuration for connector housing 30 provides a snap-fit connection, as discussed below. Upper and lower housing sections 32U, 32L include respective connector-end portions 34U, 34L, respective channel-end portions 36U, 36L that are narrower than the connector-end portions, and respective middle portions 35U, 35L surrounded by their corresponding connector-end and channel-end portions.

The above-described connector housing portions respectively define a housing connector-end portion 34 and a housing channel-end portion 36, with a housing middle portion 35 in between the connector-end and channel-end portions when upper and lower housing sections 32U, 32L are mated. Housing connector-end and channel-end portions 34 and 36 are thus at opposite ends of connector housing 30, and housing middle portion 35 is therebetween. In an example, housing middle portion 35 is tapered and gives connector housing 30 a generally tapered geometry that is narrower toward housing channel-end portion 36 and wider toward housing connector-end portion 34.

In an example, lower housing section 32L includes a locking feature 31L that snap fits with a corresponding locking feature 31U on upper housing section 32U to form the aforementioned snap-fit connection between upper and lower housing sections 32U, 32L to form connector housing 30. Upper and lower housing sections 32U, 32L may also contain alignment features 33 to ensure that the two housing sections are fitted together in the correct orientation.

FIG. 2 illustrates an example of cable assembly 8 with just lower housing section 32L in place. FIG. 3 is similar to FIG. 2 and shows upper housing section 32U positioned above lower housing section 32L in anticipation of connecting the two sections to form connector housing 30. In an example, upper housing section 32U and lower housing section 32L define a connector housing passage 60 having a connector-end passage 64 corresponding to housing connector-end portion 34, a middle passage 65 corresponding to housing middle portion 35, and a channel-end passage 66 corresponding to housing channel-end portion 36.

In an example, lower housing section 32L includes at housing middle portion 35 a protuberance 41L that provide housing passage 60 with a Y-shape, with channel passages 67A, 67B that lead from middle passage 65 to connector-end passage 64 (see FIG. 3 and FIG. 4)

Connector 10 also includes two fiber optic connector sub-assemblies ("connector sub-assemblies") 38A, 38B operably supported by connector housing 30 at connector-end portion 34. Connector sub-assemblies 38A, 38B include respective ferrules 40A, 40B configured to support optical fiber bare ends 13A, 13B. Ferrules 40A, 40B are operably supported by respective ferrule holders 41A, 41B, which also respectively hold optical fiber lead-in tubes 42A, 42B (see FIG. 4). A portion of lead-in tubes 42A, 42B extend into connector-end passage 64.

In the example connector 10 shown in FIG. 1 through FIG. 4, connector sub-assemblies 38A, 38B are LC fiber optic connector sub-assemblies that have generally rectangular housings 43A, 43B. Connector sub-assemblies 38A, 38B also include respective levers 44A, 44B, whose function is discussed below.

Figure 5:
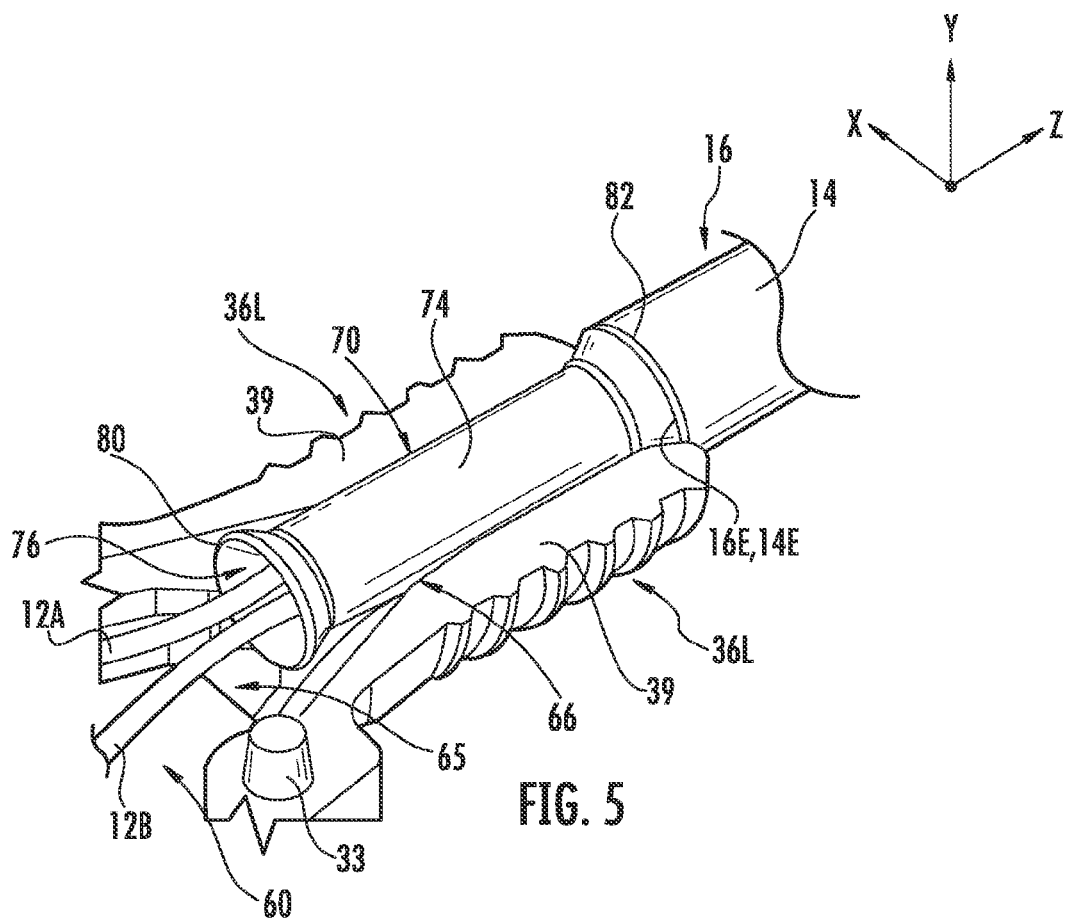
FIG. 5 is a close-up view of the optical fiber guide member as disposed in the channel-end portion of the lower housing section as shown in FIG. 3.

Connector 10 also includes an optical fiber guide member 70 arranged in channel-end passage 66. FIG. 5 is a close-up view of an example optical fiber guide member 70 as disposed in the channel-end portion 36L of lower housing section 32L. Optical fiber guide member 70 is arranged adjacent cable end 16E when cable 16 is present. In an example, optical fiber guide member 70 is in the form of a cylindrical tube with a round or oval cross-section.

Figure 6:
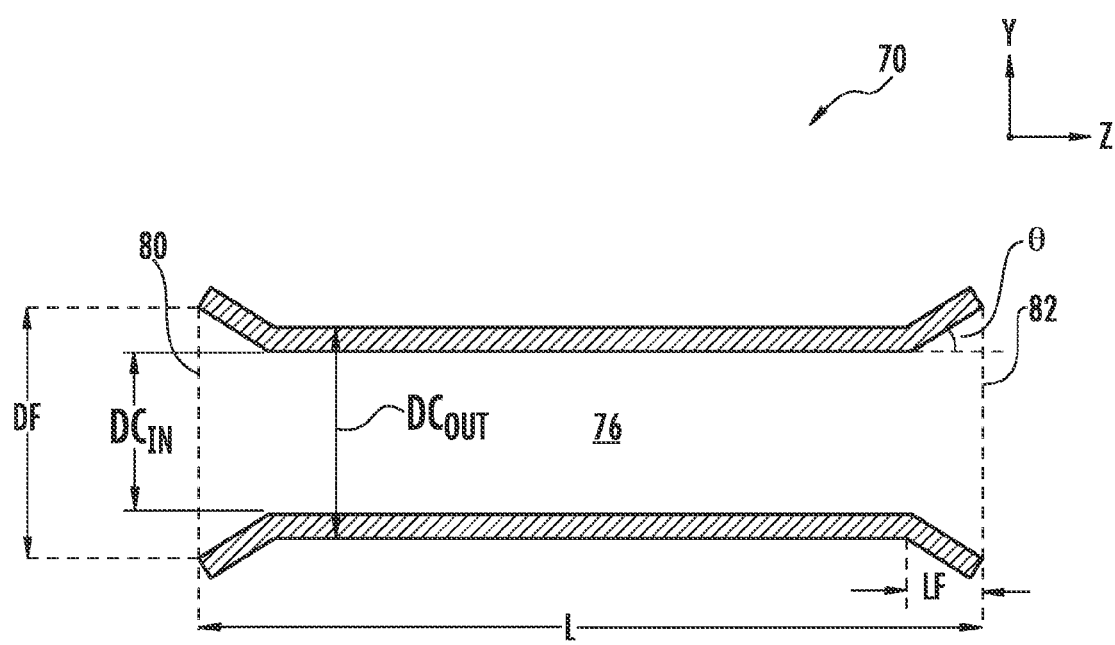
FIG. 6 is a cross-sectional view of the optical fiber guide member of FIG. 5 as taken in the Y-Z plane and illustrating a tubular guide member embodiment with two transition ends.

FIG. 6 is a cross-sectional view of an example optical fiber guide member 70 as taken in the Y-Z plane of FIG. 5 and illustrating a tubular guide member embodiment having two transition ends 80, 82, which can be for example, flared ends. Optical fiber guide member 70 has an outer surface 74 and a central conduit 76 sized to loosely confine optical fibers 12A, 12B. Optical fiber guide member 70 has opposite ends 80 and 82 that are open to central conduit 76. Optical fiber guide member 70 is fixedly disposed in channel-end passage 66. In an example, channel-end passage 66 is defined by substantially parallel housing walls 39 that form housing channel-end portions 36U, 36L. In an example, optical fiber guide member 70 is fixed within channel-end passage 66 by friction between outer surface 74 and housing walls 39 when the two housing sections 32U, 32L are mated (e.g., snapped together)

to form connector housing 30. In an example, guide member end 82 abuts cable end 16E, and further in an example can be affixed thereto.

Optical fiber guide member 70 has an axial length L, a central inside diameter $DC_{IN}$, a central outside diameter $DC_{OUT}$, the transition section can have a transition length LF, a transition angle θ, and a transition diameter DF at one or both ends 80 and 82. Example optical fiber guide member parameters include L=5.5 mm, $DC_{OUT}$=1.38 mm, $DC_{IN}$=1.05 mm, θ=30°, and LF=0.55 mm. The degree of transition at ends 80 and 82 may be different, including no transition at end 82.

Example materials for optical fiber guide member 70 include PVC, PVDF, PTFE, and like materials. Optical fiber guide member 70 can be formed by molding or by machining, and can have a unitary or a multi-body construction.

In cable assemblies utilizing multiple unbuffered optical fibers and a single connector housing, there is a risk of pinching the optical fibers between housing sections 32U and 32L, especially at or near their respective channel-end portions 36U and 36L when the housing sections are mated. If an optical fiber is pinched between the two housing sections during connector assembly, this can break or damage the optical fiber, resulting in a long-term fiber reliability issue for connector 10 and thus for cable assembly 8.

Optical fiber guide member 70 serves to loosely confine and guide optical fibers 12A, 12B from cable end 16E through connector housing passage 60 and out of transition end 80 to respective connector sub-assemblies 38A, 38B, thereby preventing the optical fibers from straying between housing sections 32U, 32L, particularly at housing channel-end portion 36. The transition end 80 of optical fiber guide member 70 faces housing connector-end portion 34 and allows for optical fibers 12A, 12B to transition and spread out toward their respective connector sub-assemblies 38A, 38B without rubbing up against a sharp or abrupt edge. Having a transition end 82 adjacent cable end 16E facilitates feeding optical fibers 12A, 12B from the cable end through optical fiber guide member central conduit 76. A transition end 82 also allows for improved contact between cable end 16E and guide member end 82 when the cable end and the guide member end abut each other.

With reference again to FIG. 1, an optical connection may be established for optical fibers 12A, 12B of cable 16 using connector 10 and adapters 46A, 46B. Two LC adapters 46A, 46B are shown in FIG. 1 and are configured to connect to respective connector sub-assemblies 38A, 38B. Connector sub-assembly levers 44A, 44B are configured to latch to respective LC adapters 46A, 46B to create a secure fit between connector sub-assemblies 38A, 38B and the LC adapters. LC adapters 46A, 46B are respectively configured to receive ferrules 40A, 40B and align them with complimentary ferrules from optical connectors (not shown) connected to the opposing end of the LC adapters.

In an example of forming cable assembly 8, a cable retention member 90 is slide over cable 16, which is then inserted through boot 20. Boot 20 and cable retention member 90 initially remain loosely arranged around cable 16 not too far from cable end 16E until they are needed later on. Upper and lower housing sections 32U, 32L are then provided. Connector sub-assemblies 38A, 36B are operably arranged in lower housing section 32L at connector-end portion 34L.

Optical fiber guide member 70 is then disposed in channel-end portion 36 of lower housing section 32L, with guide member end 82 adjacent cable end 16E and with guide member end 80 facing connector-end portion 34L. In an example, guide member end 80 may extend into middle portion 35L and thus into middle passage 65 when connector housing 30 is formed. Optical fibers 12A, 12B extending from cable end 16E are passed through guide member central conduit 76 and into housing passage 60 at middle passage 65. Optical fibers 12A, 12B are free to move within optical fiber guide member 70 but otherwise remain narrowly confined therein.

Optical fibers 12A, 12B are then passed through middle passage 65 to connector-end passage 64. The aforementioned tapered geometry for connector housing passage 60 as defined by a tapered housing middle portion 35 allows for optical fibers 12A, 12B to first be narrowly but loosely guided by optical fiber guide member 70 and then initially separated as they exit guide member transition end 80 to enter middle passage 65. In an example, optical fibers 12A, 12B are loosely guided to their respective connector sub-assemblies 38A, 38B via channel passages 67A, 67B. Optical fiber bare ends 13A, 13B are feed through their respective ferrules 40A, 40B of the corresponding connector sub-assemblies 38A, 38B.

Once optical fiber bare ends 13A, 13B are engaged by their respective connector sub-assemblies 38A, 38B, upper housing section 32U is mated to lower housing section 32L. At this point, cable retention member 90 (e.g., a crimpable ring) is slid over housing channel-end portion 36 while also engaging an end portion of cable 16 at cable end 16E. Cable retention member 90 serves to secure cable 16 to housing 30. Boot 20 is now slid over housing channel-end portion 36 so that boot end section 21 covers cable retention member 90, while the remaining part of the boot covers an end portion of cable 16.

Although the embodiments herein have been described with reference to particular features, it is to be understood that these embodiments are merely illustrative of the principles and applications thereof. It is therefore to be understood that numerous modifications may be made to the illustrative embodiments and that other arrangements may be devised without departing from the scope of the appended claims.

What is claimed is:

1. A fiber optic connector for connecting at least one optical fiber extending from an end of a fiber optic cable, comprising:
a connector housing, the connector housing having mateable sections that when mated define a housing passage having respective connector-end and channel-end portions that define respective connector-end and channel-end passages, with the channel-end portion configured to be arranged adjacent the fiber optic cable end;
an optical fiber guide member, the optical fiber guide member disposed in the channel-end passage, the guide member having a first transition end associated with the connector-end passage, and the optical fiber guide member defining a conduit configured to loosely confine and guide the optical fibers toward the connector-end passage; and
at least one connector sub-assembly operably supported at the connector-end and configured to respectively receive an end of the at least one optical fiber.

2. The fiber optic connector according to claim 1, further comprising the optical fiber guide member having a second transition end opposite the first transition end.

3. The fiber optic connector according to claim 1, further comprising the connector housing sections being configured to snap-connect to each other.

4. The fiber optic connector according to claim 1, further comprising the at least one connector sub-assembly being part of a duplex connector configuration.

5. The fiber optic connector according to claim 1, wherein the optical fiber guide member includes an outer surface and the channel-end passage is defined by housing sidewalls, and further comprising holding the optical fiber guide member in the channel-end passage by friction between the guide member outer surface and the housing sidewalls.

6. A cable assembly, comprising:
the fiber optic connector of claim 1; and
the fiber optic cable operably engaged to the fiber optic connector at the channel-end portion, with the at least one optical fiber passing through the optical fiber guide member conduit and into the connector end passage, and the fiber end of the at least one optical fiber operably supported by the at least one connector sub-assembly.

7. The cable assembly according to claim 6, further comprising:
a cable retention member that engages the connector housing at the channel-end portion and engages the end of the fiber optic cable; and
a flexible boot that surrounds the cable retention member and the fiber optic cable end.

8. The cable assembly according to claim 7, further comprising:
at least one adapter configured to engage the at least one of the connector sub-assembly.

9. A method of forming a fiber optic cable assembly for first and second optical fibers extending from an end of a duplex fiber optic cable and having respective first and second bare ends, comprising:
providing a connector housing having opposing first and second mateable housing sections and opposite wide-end and channel-end portions that define a housing passage having corresponding wide-end and channel-end passages;
operably arranging first and second connector sub-assemblies at the housing wide-end portion;
providing an optical fiber guide member having a central conduit and a first flared end defining a central passage through the optical fiber guide member;
fixedly disposing the optical fiber guide member in the channel-end passage with the first flared end facing the wide-end passage;
leading the first and second optical fibers from the cable end, through the central passage of the optical fiber guide member central conduit and first flared end, out the first flared end, and through the housing passage to the first and second connector sub-assemblies; and
respectively optically engaging the first and second optical fiber bare ends in the first and second connector sub-assemblies.

10. The method of claim 9, further comprising snap-connecting the first and second mateable housing sections to form the connector housing.

11. The method of claim 9, further comprising providing the first and second connector sub-assemblies with first and second LC connector housings.

12. The method of claim 9, wherein the channel-end passage is defined by housing sidewalls, the optical fiber guide member has an outer surface, and further comprising fixedly disposing the guide member in the channel-end passage by holding the guide member in the channel-end passage by friction between the guide member outer surface and the housing sidewalls.

13. The method of claim 9, further comprising;
securing the cable to the connector housing at the channel-end portion using a cable retention member; and
covering the cable retention member and a portion of the cable with a flexible boot.

14. The method of claim 9, further comprising providing the optical fiber guide member with a second flared end that resides adjacent the duplex optical fiber cable end.

15. The method of claim 9, further comprising engaging one or both connector sub-assemblies to at least one LC adapter.

16. An LC fiber optic connector for connecting first and second optical fibers that extend from an end of a duplex fiber optic cable, comprising:
a tapered connector housing having a wide-end portion and a channel-end portion, and defining a passage from the channel-end portion to the wide-end portion;
first and second LC connector sub-assemblies operably arranged at the wide-end portion and configured to respectively support first and second bare ends of the first and second optical fibers; and
an optical fiber guide member fixedly disposed at the channel-end portion and having a transition end that faces the wide-end portion, the guide member sized to loosely confine and guide the first and second optical fibers from the cable end into the housing passage for connection to the first and second LC connector sub-assemblies.

17. The LC fiber optic connector of claim 16, further comprising the connector housing having upper and lower sections configured to snap-connect to each other.

18. The LC fiber optic connector according to claim 16, further comprising the first and second connector sub-assemblies respectively having first and second LC connector housings.

19. The LC fiber optic connector according to claim 17, wherein the optical fiber guide member is fixedly held in the channel-end portion by friction between the optical fiber guide member and the connector housing.

20. An LC fiber optic cable assembly, comprising:
the connector of claim 16; and
the duplex fiber optic cable secured to the channel-end portion of the connector housing, with the first and second optical fibers passing through the optical fiber guide member and out of the transition end and then through the housing passage, with the first and second optical fiber bare ends operably supported by the first and second LC connector sub-assemblies.

21. The method of claim 11, wherein the first and second LC connector housings form an LC duplex connector.

22. The LC fiber optic connector according to claim 18, wherein the first and second LC connector housings form an LC duplex connector.

* * * * *